United States Patent Office 2,888,430
Patented May 26, 1959

2,888,430

OXYALKYLATED POLYEPOXIDE - TREATED AMINE-MODIFIED THERMOPLASTIC PHENOL ALDEHYDE RESINS, AND METHOD OF MAKING SAME

Melvin De Groote, St. Louis, and Kwan-ting Shen, Brentwood, Mo., assignors to Petrolite Corporation, Wilmington, Del., a corporation of Delaware No Drawing. Original application June 26, 1953, Serial No. 364,504, now Patent No. 2,771,428, dated November 20, 1956. Divided and this application September 11, 1956, Serial No. 609,099

4 Claims. (Cl. 260—45)

The present invention is a continuation-in-part of our copending application, Serial No. 338,576, filed February 24, 1953, now U.S. Patent 2,771,438 and a division of our copending application Serial No. 364,504, filed June 26, 1953, now U.S. Patent 2,771,428.

Our invention is concerned with new chemical products or compounds useful as demulsifying agents in processes or procedures particularly adapted for preventing, breaking or resolving emulsions of the water-in-oil type and particularly petroleum emulsions. Our invention is also concerned with the application of such chemical products or compounds in various other arts and industries as well as with methods of manufacturing the new chemical products or compounds which are of outstanding value in demulsification.

The present invention is concerned with a three-step manufacturing method involving (1) condensing certain phenol aldehyde resins, hereinafter described in detail, with certain basic hydroxylated polyamines, hereinafter described in detail, and formaldehyde; (2) oxyalkylation of the condensation product with certain phenolic polyepoxides hereinafter described in detail; and (3) oxyalkylation of the previously oxyalkylated resin condensate with certain monoepoxides, also hereinafter described in detail.

For a number of reasons it is usually most desirable to use the diepoxide type of polyepoxide. In preparing diepoxides or the low molal polymers one usually obtains cogeneric materials which may include monoepoxides. However, the cogeneric mixture is invariably characterized by the fact that there is on the average, based on the molecular weight, of course, more than one epoxide group per molecule.

A more limited aspect of the present invention is represented by the products wherein the polyepoxide is represented by (1) compounds of the following formula:

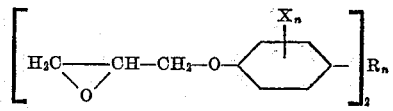

and (2) cogenerically associated compounds formed in the preparation of (1) preceding, with the proviso that it consists principally of the monomer as distinguished from other cogeners.

Notwithstanding the fact that subsequent data will be presented in considerable detail, yet the description becomes somewhat involved and certain facts should be kept in mind. The epoxides, and particularly the diepoxides may have no connecting bridge between the phenolic nuclei as in the case of a diphenyl derivative or may have a variety of connecting bridges, i.e., divalent linking radicals. Our preference is that either diphenyl compounds be employed or else compounds where the divalent link is obtained by the removal of a carbonyl oxygen atom as derived from a ketone or aldehyde.

If it were not for the expense involved in preparing and purifying the monomer we would prefer it to any other form, i.e., in preference to the polymer or mixture of polymer and monomer.

Stated another way, we would prefer to use materials of the kind described, for example, in U.S. Patent No. 2,530,353, dated November 14, 1950. Said patent describes compounds having the general formula

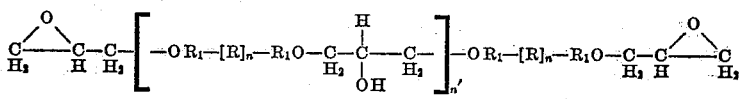

wherein R is an aliphatic hydrocarbon bridge, each $n$ independently has one of the values 0 and 1, and X is an alkyl radical containing from 1 to 4 carbon atoms.

The compounds having two oxirane rings and employed for combination with the reactive amine-modified phenolaldehyde resin condensates as herein described are characterized by the following formula and cogenerically associated compounds formed in their preparation:

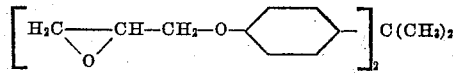

in which R represents a divalent radical selected from the class of ketone residues formed by the elimination of the ketonic oxygen atom and aldehyde residues obtained by the elimination of the aldehydic oxygen atom, the divalent radical $$\begin{array}{cc} H & H \\ -C-C- \\ H & H \end{array}$$

the divalent

radical, the divalent sulfone radical, and the divalent monosulfide radical —S—, the divalent radical

—CH$_2$SCH$_2$— and the divalent disulfide radical —S—S—; and R$_1$O is the divalent radical obtained by the elimination of a hydroxyl hydrogen atom and a nuclear hydrogen atom from the phenol

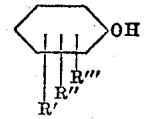

in which R′, R″, and R‴ represent hydrogen and hydrocarbon substituents of the aromatic nucleus, said substituent member having not over 18 carbon atoms; $n$ represents an integer including zero and 1 and $n'$ represents a whole number not greater than 3. The above mentioned compounds and those cogenerically associated compounds formed in their preparation are thermoplastic and organic solvent soluble. Reference to being thermoplastic characterizes products as being liquids at ordinary temperature or readily convertible to liquids by merely heating below the point of pyrolysis and thus differentiates them from infusible resins. Reference to being soluble in an organic solvent means any of the usual organic solvents, such as alcohols, ketones, esters, ethers, mixed solvents, etc. Reference to solubility is merely to differentiate from a reactant which is not soluble and might be not only insoluble but also infusible. Furthermore, solubility is a factor insofar that it is sometimes desirable to dilute the compound containing the epoxy rings before reacting with the amine resin condensate. In such instances, of course, the solvent selected would have to be one which is not susceptible to oxyalkylation, as, for example, kerosene, benzene, toluene, dioxane, various ketones, chlorinated solvents, dibutyl ether, dihexyl ether, ethyleneglycol diethylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter the word "epoxy" unless indicated otherwise, will be used to mean the oxirane ring, i.e., the 1,2-epoxy ring. Furthermore, where a compound has two or more oxirane rings they will be referred to as polyepoxides. They usually represent, of course, 1,2-epoxide rings or oxirane rings in the alpha-omega position. This is a departure, of course, from the standpoint of strictly formal nomenclature as in the example of the simplest diepoxide which contains at least 4 carbon atoms and is formally described as 1,2-epoxy-3,4-epoxybutane (1,2-3,4 diepoxybutane).

Having obtained a reactant having generally 2 epoxy rings as depicted in the last formula preceding, or low molal polymers thereof, it becomes obvious the reaction can take place with any amine-modified phenol-aldehyde resin by virtue of the fact that there are always present reactive hydroxyl groups which are part of the phenolic nuclei and there may be present reactive hydrogen atoms attached to a nitrogen atom, or an oxygen atom, depending on the presence of a hydroxylated group or secondary amino group.

To illustrate the products which represent the subject matter of the present invention reference will be made to a reaction involving a mole of the oxyalkylating agent, i.e., the compound having 2 oxirane rings and an amine condensate. Proceeding with the example previously described it is obvious the reaction ratio of 2 moles of the amine condensate to one mole of the oxyalkylating agent gives a product which may be indicated as follows:

of xylene and 20 parts of methanol, or 70 parts of xylene and 30 parts of methanol, can be used. Sometimes it is desirable to add a small amount of acetone to the xylene-methanol mixture, for instance, 5% to 10% of acetone.

A mere examination of the nature of the products before and after treatment with the polyepoxide reveals that the polyepoxide by and large introduces increased hydrophobe character or, inversely, causes a decrease in hydrophile character. However, the solubility characteristics of the final product, i.e., the product obtained by oxyalkylation of a monoepoxide, may vary all over the map. This is perfectly understandable because ethylene oxide, glycide, and to a lesser extent methyl glycide, introduce predominantly hydrophile character, while propylene oxide and more especially butylene oxide, introduce primarily hydrophobe character. A mixture of the various oxides will produce a balancing in solubility characteristics or in the hydrophile-hydrophobe character so as to be about the same as prior to oxyalkylation with the monoepoxide.

The oxyalkylated polyepoxide treated condensates obtained in the manner described are, in turn, oxyalkylation-susceptible and valuable derivatives can be obtained by further reaction with other alkylene oxides, for instance, styrene (phenyl ethylene) oxide, cyclohexylethylene oxide, ethylene imine, propylene imine, acrylonitrile, etc.

Similarly, the oxyalkylated polyepoxide-derived compounds can be reacted with a product having both a nitrogen group and a 1,2-epoxy group, such as 3-dialkyl-aminoepoxypropane. See U.S. Patent No. 2,520,093, dated August 22, 1950, to Gross.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

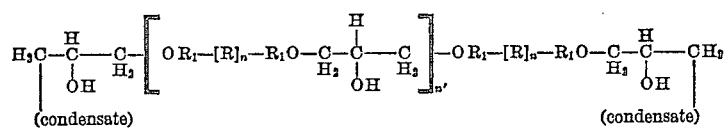

(condensate)                                                                (condensate)

in which the various characters have their previous significance and the characterization "condensate" is simply an abbreviation for the condensate which is described in greater detail subsequently.

Such intermediate product in turn also must be soluble but solubility is not limited to an organic solvent but may include water, or for that matter, a solution of water containing an acid such as hydrochloric acid, acetic acid, hydroxyacetic acid, etc. In other words, the nitrogen groups present, whether two or more, may or may not be significantly basic and it is immaterial whether aqueous solubility represents an anhydro base or the free base (combination with water) or a salt form which is the acetate, chloride, etc. The purpose in this instance is to differentiate from insoluble resinous materials, particularly those resulting from gelation or cross-linking. Not only does this property serve to differentiate from instances where an insoluble material is desired, but also serves to emphasize the fact that in many instances the preferred compounds have distinct water-solubility or are distinctly dispersible in 5% gluconic acid. For instance, the products freed from any solvent can be shaken with 5 to 20 times their weight of 5% gluconic acid at ordinary temperature and show at least some tendency towards being self-dispersing. The solvent which is generally tried is xylene. If xylene alone does not serve then a mixture of xylene and methanol, for instance, 80 parts The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example for cosmetics, spray oils, water-repellent textile finishes; as lubricants, etc.

As far as the use of the herein described products goes for purpose of resolution of petroleum emulsions of the water-in-oil type, we particularly prefer to use those which as such or in the form of the free base or hydrate, i.e., combination with water or particularly in the form of a low molal organic acid salt such as the gluconates or the acetate or hydroxy acetate, have sufficiently hydrophile character to at least meet the test set forth in U.S. Patent No. 2,499,368, dated March 7, 1950, to De Groote et al. In said patent such test for emulsification using a water-insoluble solvent, generally xylene, is described as an index of surface activity.

In the present instance the various condensation products as such or in the form of the free base or in the form of the acetate, may not necessarily be xylene-soluble although they are in many instances. If such compounds are not xylene-soluble the obvious chemical equivalent or equivalent chemical test can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

For purpose of convenience what is said hereinafter will be divided into ten parts with Part 3, in turn, being divided into three subdivisions:

Part 1 is concerned with our preference in regard to the polyepoxide and particularly the diepoxide reactant;

Part 2 is concerned with certain theoretical aspects of diepoxide preparation;

Part 3, Subdivision A, is concerned with the preparation of monomeric diepoxides, including Table I;

Part 3, Subdivision B, is concerned with the preparation of low molal polymeric epoxides or mixtures containing low molal polymeric epoxides as well as the monomer and includes Table II;

Part 3, Subdivision C, is concerned with miscellaneous phenolic reactants suitable for diepoxide preparation;

Part 4 is concerned with the phenol-aldehyde resin which is subjected to modification by condensation reaction to yield the amine-modified resin;

Part 5 is concerned with appropriate basic hydroxylated polyamines which may be employed in the preparation of the herein-described amine-modified resins;

Part 6 is concerned with reactions involving the resin, the amine, and formaldehyde to produce specific products, or compounds which are then subjected to reaction with polyepoxides;

Part 7 is concerned with the reactions involving the two preceding types of materials and examples obtained by such reaction. Generally speaking, this involves nothing more than a reaction between 2 moles of a previously prepared amine-modified phenol-aldehyde resin condensate as described, and one mole of a polyepoxide so as to yield a new and larger resin molecule, or comparable product;

Part 8 is concerned with the use of a monoepoxide in oxyalkylating the products described in Part 7, preceding, i.e., those derived by means of reaction between a polyepoxide and an amine-modified phenol-aldehyde resin as described;

Part 9 is concerned with the resolution of petroleum emulsions of the water-in-oil type by means of the previously described chemical compounds or reaction products;

Part 10 is concerned with uses for the products herein described, either as such or after modification, including any applications other than those involving resolution of petroleum emulsions of the water-in-oil type.

PART 1

As will be pointed out subsequently, the preparation of polyepoxides may include the formation of a small amount of material having more than two epoxide groups per molecule. If such compounds are formed they are perfectly suitable except to the extent they may tend to produce ultimate reaction products which are not solvent-soluble liquids or low-melting solids. Indeed, they tend to form thermosetting resins or insoluble materials. Thus, the specific objective by and large is to produce diepoxides as free as possible from any monoepoxides and as free as possible from polyepoxides in which there are more than two epoxide groups per molecule. Thus, for practical purposes what is said hereinafter is largely limited to polyepoxides in the form of diepoxides.

As has been pointed out previously one of the reactants employed is a diepoxide reactant. It is generally obtained from phenol (hydroxybenzene) or substituted phenol. The ordinary or conventional manufacture of the epoxides usually results in the formation of a co-generic mixture as explained subsequently. Preparation of the monomer or separation of the monomer from the remaining mass of the co-generic mixture is usually expensive. If monomers were available commercially at a low cost, or if they could be prepared without added expense for separation, our preference would be to use the monomer. Certain monomers have been prepared and described in the literature and will be referred to subsequently. However, from a practical standpoint one must weigh the advantage, if any, that the monomer has over other low molal polymers from a cost standpoint; thus, we have found that one might as well attempt to prepare a monomer and fully recognize that there may be present, and probably invariably are present, other low molal polymers in comparatively small amounts. Thus, the materials which are most apt to be used for practical reasons are either monomers with some small amounts of polymers present or mixtures which have a substantial amount of polymers present. Indeed, the mixture can be prepared free from monomers and still be satisfactory. Briefly, then, our preference is to use the monomer or the monomer with the minimum amount of higher polymers.

It has been pointed out previously that the phenolic nuclei in the epoxide reactant may be directly united, or united through a variety of divalent radicals. Actually, it is our preference to use those which are commercially available and for most practical purposes it means instances where the phenolic nuclei are either united directly without any intervening linking radical, or else united by a ketone residue or formaldehyde residue. The commercial bis-phenols available now in the open market illustrate one class. The diphenyl derivatives illustrate a second class, and the materials obtained by reacting substituted monofunctional phenols with an aldehyde illustrate the third class. All the various known classes may be used but our preference rests with these classes due to their availability and ease of preparation, and also due to the fact that the cost is lower than in other examples.

Although the diepoxide reactants can be produced in more than one way, as pointed out elsewhere, our preference is to produce them by means of the epichlorohydrin reaction referred to in detail subsequently.

One epoxide which can be purchased in the open market and contains only a modest amount of polymers corresponds to the derivative of bis-phenol A. It can be used as such, or the monomer can be separated by an added step which involves additional expense. This compound of the following structure is preferred as the epoxide reactant and will be used for illustration repeatedly with the full understanding that any of the other epoxides described are equally satisfactory, or that the higher polymers are satisfactory, or that mixtures of the monomer and higher polymers are satisfactory. The formula for this compound is

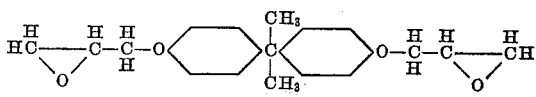

Reference has just been made to bis-phenol A and a suitable epoxide derived therefrom. Bis-phenol A is dihydroxy-diphenyl-dimethyl methane, with the 4,4' isomers predominating and with lesser quantities of the 2,2' and 4,2' isomers being present. It is immaterial which one of these isomers is used and the commercially available mixture is entirely satisfactory.

Attention is again directed to the fact that in the instant part, to wit, Part 1, and in succeeding parts, the text is concerned almost entirely with epoxides in which there is no bridging radical or the bridging radical is derived from an aldehyde or a ketone. It would be immaterial if the divalent linking radical would be derived from the other groups illustrated for the reason that nothing more than mere substitution of one compound for the other would be required. Thus, what is said hereinafter, although directed to one class or a few classes, applies with equal force and effect to the other classes of epoxide reactants.

If sulfur-containing compounds are prepared they should be freed from impurities with considerable care for the reason that any time that a low-molal sulfur-containing compound can react with epichlorohydrin there may be formed a by-product in which the chlorine happened to be particularly reactive and may represent a product, or a mixture of products, which would be unusually toxic, even though in comparatively small concentration.

PART 2

The polyepoxides and particularly the diepoxides can be derived by more than one method as, for example, the use of epichlorohydrin or glycerol dichlorohydrin. A number of problems are involved in attempting to produce these materials free from cogeneric materials of related composition. For a discussion of these difficulties, reference is made to U.S. Patent No. 2,819,212, beginning at column 7, line 21.

PART 3

Subdivision A

The preparations of the diepoxy derivatives of the diphenols, which are sometimes referred to as diglycidyl ethers, have been described in a number of patents. For convenience, reference will be made to two only, to wit, aforementioned U.S. Patent 2,506,486, and aforementioned U.S. Patent No. 2,530,353.

Purely by way of illustration, the following diepoxides, or diglycidyl ethers as they are sometimes termed, are included for purpose of illustration. These particular compounds are described in the two patents just mentioned.

TABLE I

| Example number | Diphenol | Diglycidyl ether | Patent reference |
|---|---|---|---|
| 1A | $CH_2(C_6H_4OH)_2$ | Di(epoxypropoxyphenyl)methane | 2,506,486 |
| 2A | $CH_3CH(C_6H_4OH)_2$ | Di(epoxypropoxyphenyl)methylmethane | 2,506,486 |
| 3A | $(CH_3)_2C(C_6H_4OH)_2$ | Di(epoxypropoxyphenyl)dimethylmethane | 2,506,486 |
| 4A | $C_2H_5C(CH_3)(C_6H_4OH)_2$ | Di(epoxypropoxyphenyl)ethylmethylmethane | 2,506,486 |
| 5A | $(C_2H_5)_2C(C_6H_4OH)_2$ | Di(epoxypropoxyphenyl)diethylmethane | 2,506,486 |
| 6A | $CH_3C(C_3H_7)(C_6H_4OH)_2$ | Di(epoxypropoxyphenyl)methylpropylmethane | 2,506,486 |
| 7A | $CH_3C(C_6H_5)(C_6H_4OH)_2$ | Di(epoxypropoxyphenyl)methylphenylmethane | 2,506,486 |
| 8A | $C_2H_5C(C_6H_5)(C_6H_4OH)_2$ | Di(epoxypropoxyphenyl)ethylphenylmethane | 2,506,486 |
| 9A | $C_3H_7C(C_6H_5)(C_6H_4OH)_2$ | Di(epoxypropoxyphenyl)propylphenylmethane | 2,506,486 |
| 10A | $C_4H_9C(C_6H_5)(C_6H_4OH)_2$ | Di(epoxypropoxyphenyl)butylphenylmethane | 2,506,486 |
| 11A | $(CH_3C_6H_4)CH(C_6H_4OH)_2$ | Di(epoxypropoxyphenyl)tolylmethane | 2,506,486 |
| 12A | $(CH_3C_6H_4)C(CH_3)(C_6H_4OH)_2$ | Di(epoxypropoxyphenyl)tolylmethylmethane | 2,506,486 |
| 13A | Dihydroxy diphenyl | 4,4'-bis(2,3-epoxypropoxy)diphenyl | 2,530,353 |
| 14A | $(CH_3)C(C_4H_5.C_6H_3OH)_2$ | 2,2-bis(4-(2,3-epoxypropoxy)2-tertiarybutyl phenyl)propane | 2,530,353 |

Subdivision B

As to the preparation of low-molal polymeric epoxides or mixtures reference is made to numerous patents and particularly the aforementioned U.S. Patents Nos. 2,575,558 and 2,582,985.

In light of aforementioned U.S. Patent No. 2,575,558, the following examples can be specified by reference to the formula therein provided one still bears in mind it is in essence an over-simplification.

TABLE II

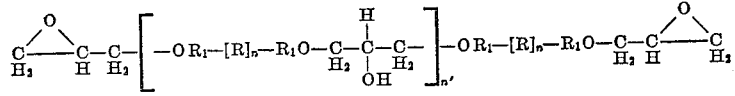

(in which the characters have their previous significance)

| Example Number | —R₁O— from HR₁OH | —R— | $n$ | $n'$ | Remarks |
|---|---|---|---|---|---|
| B1 | Hydroxy benzene | $\begin{array}{c}CH_3\\|\\-C-\\|\\CH_3\end{array}$ | 1 | 0, 1, 2 | Phenol known as bis-phenol A. Low polymeric mixture about ⅔ or more where $n'=0$, remainder largely where $n'=1$, some where $n'=2$. |
| B2 | do | $\begin{array}{c}CH_3\\|\\-C-\\|\\CH_2\\|\\CH_3\end{array}$ | 1 | 0, 1, 2 | Phenol known as bis-phenol B. See note regarding B1 above. |
| B3 | Orthobutylphenol | $\begin{array}{c}CH_3\\|\\-C-\\|\\CH_3\end{array}$ | 1 | 0, 1, 2 | Even though $n'$ is preferably 0, yet the usual reaction product might well contain materials where $n'$ is 1, or to a lesser degree 2. |
| B4 | Orthoamylphenol | $\begin{array}{c}CH_3\\|\\-C-\\|\\CH_3\end{array}$ | 1 | 0, 1, 2 | Do. |
| B5 | Orthooctylphenol | $\begin{array}{c}CH_3\\|\\-C-\\|\\CH_3\end{array}$ | 1 | 0, 1, 2 | Do. |

TABLE II—Continued

| Example Number | —R¹O— from HR¹OH | —R— | $n$ | $n'$ | Remarks |
|---|---|---|---|---|---|
| B6 | Orthononylphenol | $\mathrm{CH_3}\!-\!\underset{\mathrm{CH_3}}{\overset{\mid}{\mathrm{C}}}\!-$ | 1 | 0, 1, 2 | Even though $n'$ is preferably 0, yet the usual reaction product might well contain materials where $n'$ is 1, or to a lesser degree 2. |
| B7 | Orthododecylphenol | $\mathrm{CH_3}\!-\!\underset{\mathrm{CH_3}}{\overset{\mid}{\mathrm{C}}}\!-$ | 1 | 0, 1, 2 | Do. |
| B8 | Metacresol | $\mathrm{CH_3}\!-\!\underset{\mathrm{CH_3}}{\overset{\mid}{\mathrm{C}}}\!-$ | 1 | 0, 1, 2 | See prior note. This phenol used as initial material is known as bis-phenol C. For other suitable bis-phenols see U. S. Patent 2,564,191. |
| B9 | ....do.... | $\mathrm{CH_3}\!-\!\underset{\underset{\mathrm{CH_3}}{\mid}}{\overset{\mid}{\underset{\mathrm{CH_2}}{\mathrm{C}}}}\!-$ | 1 | 0, 1, 2 | See prior note. |
| B10 | Dibutyl (ortho-para) phenol | $\mathrm{H}\!-\!\underset{\mathrm{H}}{\overset{\mid}{\mathrm{C}}}\!-$ | 1 | 0, 1, 2 | Do. |
| B11 | Diamyl (ortho-para) phenol | $\mathrm{H}\!-\!\underset{\mathrm{H}}{\overset{\mid}{\mathrm{C}}}\!-$ | 1 | 0, 1, 2 | Do. |
| B12 | Dioctyl (ortho-para) phenol | $\mathrm{H}\!-\!\underset{\mathrm{H}}{\overset{\mid}{\mathrm{C}}}\!-$ | 1 | 0, 1, 2 | Do. |
| B13 | Dinonyl (ortho-para) phenol | $\mathrm{H}\!-\!\underset{\mathrm{H}}{\overset{\mid}{\mathrm{C}}}\!-$ | 1 | 0, 1, 2 | Do. |
| B14 | Diamyl (ortho-para) phenol | $\mathrm{H}\!-\!\underset{\mathrm{CH_3}}{\overset{\mid}{\mathrm{C}}}\!-$ | 1 | 0, 1, 2 | Do. |
| B15 | ....do.... | $\mathrm{H}\!-\!\underset{\mathrm{C_2H_5}}{\overset{\mid}{\mathrm{C}}}\!-$ | 1 | 0, 1, 2 | Do. |
| B16 | Hydroxy benzene | $\underset{\mathrm{O}}{\overset{\mathrm{O}}{\overset{\|}{\mathrm{S}}}}$ | 1 | 0, 1, 2 | Do. |
| B17 | Diamyl phenol (ortho-para) | —S—S— | 1 | 0, 1, 2 | Do. |
| B18 | ....do.... | —S— | 1 | 0, 1, 2 | Do. |
| B19 | Dibutyl phenol (ortho-para) | $\mathrm{H}\;\;\mathrm{H}\atop -\mathrm{C}-\mathrm{C}-\atop \mathrm{H}\;\;\mathrm{H}$ | 1 | 0, 1, 2 | Do. |
| B20 | ....do.... | $\mathrm{H}\;\;\mathrm{H}\atop -\mathrm{C}-\mathrm{C}-\atop \mathrm{H}\;\;\mathrm{H}$ | 1 | 0, 1, 2 | Do. |
| B21 | Dinonyl phenol (ortho-para) | $\mathrm{H}\;\;\mathrm{H}\atop -\mathrm{C}-\mathrm{C}-\atop \mathrm{H}\;\;\mathrm{H}$ | 1 | 0, 1, 2 | Do. |
| B22 | Hydroxy benzene | $\overset{\mathrm{O}}{\overset{\|}{-\mathrm{C}-}}$ | 1 | 0, 1, 2 | Do. |
| B23 | ....do.... | None | 0 | 0, 1, 2 | Do. |
| B24 | Ortho-isopropyl phenol | $\mathrm{CH_3}\!-\!\underset{\mathrm{CH_3}}{\overset{\mid}{\mathrm{C}}}\!-$ | 1 | 0, 1, 2 | See prior note. (As to preparation of 4,4'-isopropylidene bis-(2-isopropylphenol) see U. S. Patent No. 2,482,748, dated Sept. 27, 1949, to Dietzler.) |
| B25 | Para-octyl phenol | —CH₂—S—CH₂— | 1 | 0, 1, 2 | See prior note. (As to preparation of the phenol sulfide see U. S. Patent No. 2,488,134, dated Nov. 15, 1949, to Mikeska et al.) |
| B26 | Hydroxy benzene | $\mathrm{CH_3}\!-\!\underset{\underset{\underset{\mathrm{C_2H_5}}{\mid}}{\underset{\mathrm{O}}{\mid}}}{\overset{\mid}{\underset{\mathrm{CH_2}}{\mathrm{C}}}}\!-$ | 1 | 0, 1, 2 | See prior note. (As to preparation of the phenol sulfide see U. S. Patent No. 2,526,545.) |

Subdivision C

The prior examples have been limited largely to those in which there is no divalent linking radical, as in the case of diphenyl compounds, or where the linking radical is derived from a ketone or aldehyde, particularly a ketone. Needless to say, the same procedure is employed in converting diphenyl into a diglycidyl ether regardless of the nature of the bond between the two phenolic nuclei. For purpose of illustration attention is directed to numerous other diphenols which can be readily converted to a suitable polyepoxide, and particularly diepoxide, reactant.

As previously pointed out the initial phenol may be substituted, and the substituent group in turn may be a cyclic group such as the phenyl group or cyclohexyl group as in the instance of cyclohexylphenol or phenylphenol. Such substituents are usually in the ortho position and may be illustrated by a phenol of the following composition:

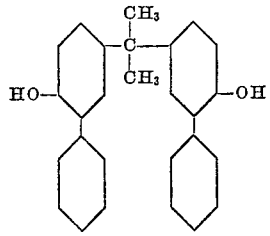

Similar phenols which are monofunctional, for instance, paraphenyl phenol or paracyclohexyl phenol with an additional substituent in the ortho position, may be employed in reactions previously referred to, for instance, with formaldehyde or sulfur chlorides to give comparable phenolic compounds having 2 hydroxyls and suitable for subsequent reaction with epichlorohydrin, etc.

Other samples include:

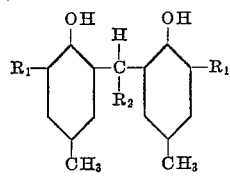

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups, and wherein said alkyl group contains at least 3 carbon atoms. See U.S. Patent No. 2,515,907.

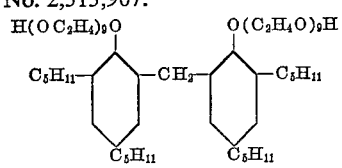

in which the —$C_5H_{11}$ groups are secondary amyl groups. See U.S. Patent No. 2,504,064.

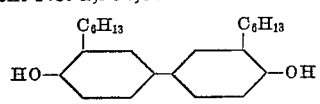

See U. S. Patent No. 2,285,563.

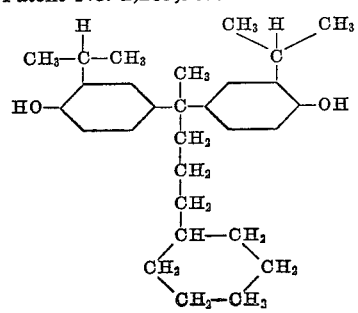

See U.S. Patent No. 2,503,196.

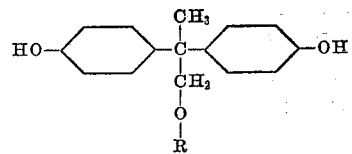

wherein R is a member of the group consisting of alkyl, and alkoxyalkyl radicals containing from 1 to 5 carbon atoms, inclusive, and aryl and chloraryl radicals of the benzene series. See U.S. Patent No. 2,526,545.

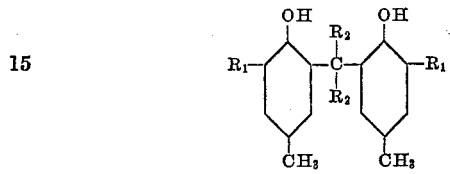

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups. See U.S. Patent No. 2,515,906.

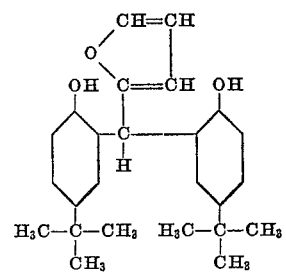

See U.S. Patent No. 2,515,908.

As to sulfides, the following compound is of interest:

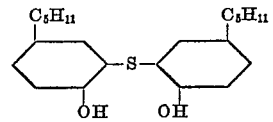

See U.S. Patent No. 2,331,448.

As to descriptions of various suitable phenol sulfides, reference is made to the following patents: U. S. Patents Nos. 2,246,321, 2,207,719, 2,174,248, 2,139,766, 2,244,021, and 2,195,539.

As to sulfones, see U. S. Patent No. 2,122,958.

As to suitable compounds obtained by the use of formaldehyde or some other aldehyde, particularly compounds such as

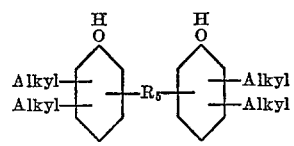

in which $R_5$ is a methylene radical, or a substituted methylene radical which represents the residue of an aldehyde and is preferably the unsubstituted methylene radical derived from formaldehyde. See U.S. Patent No. 2,430,002.

See also U. S. Patent No. 2,581,919 which describes di(dialkyl cresol) sulfides which include the monosulfides, the disulfides, and the polysulfides. The following formula represents the various dicresol sulfides of this invention:

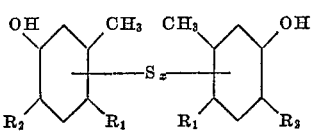

in which $R_1$ and $R_2$ are alkyl groups, the sum of whose carbon atoms equals 6 to about 20, and $R_1$ and $R_2$ each preferably contain 3 to about 10 carbon atoms, and x is 1 to 4. The term "sulfides" as used in this text, therefore, includes monosulfide, disulfide, and polysulfides.

PART 4

It is well known that one can readily purchase on the open market, or prepare, fusible, organic solvent-soluble, water-insoluble resin polymers of a composition approximated in an idealized form by the formula

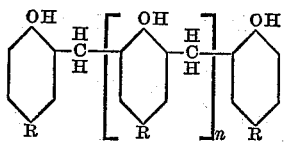

In the above formula n represents a small whole number varying from 1 to 6, 7, or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i.e., n varies from 1 to 4; R represents an aliphatic hydrocarbon substituent, generally an alkyl radical having from 4 to 15 carbon atoms, such as a butyl, amyl, hexyl, decyl, or dodecyl radical. Where the divalent bridge radical is shown as being derived from formaldehyde it may, of course, be derived from any other reactive aldehyde having 8 carbon atoms or less.

Because a resin is organic solvent-soluble does not mean it is necessarily soluble in any organic solvent. This is particularly true where the resins are derived from trifunctional phenols as previously noted. However, even when obtained from a difunctional phenol, for instance paraphenylphenol, one may obtain a resin which is not soluble in a nonoxygenated solvent, such as benzene, or xylene, but requires an oxygenated solvent such as a low molal alcohol, dioxane, or diethyleneglycol diethylether. Sometimes a mixture of the two solvents (oxygenated and nonoxygenated) will serve. See Example 9a of U.S. Patent No. 2,499,365, dated March 7, 1950, to De Groote and Keiser.

The resins herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U.S. Patent No. 2,499,365, or in U.S. Patent No. 2,499,368, dated March 7, 1950, to De Groote and Keiser. In said patent there are described oxyalkylation-susceptible, fusible, nonoxygenated organic solvent-soluble, water-insoluble, low-stage phenol-aldehyde resins having an average molecular weight corresponding to at least 3 and not over 6 phenolic nuclei per resin molecule. These resins are difunctional only in regard to methylol-forming reactivity, are derived by reaction between a difunctional monohydric phenol and an aldehyde having not over 8 carbon atoms and reactive toward said phenol, and are formed in the substantial absence of trifunctional phenols. The phenol is of the formula

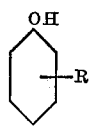

in which R is an aliphatic hydrocarbon radical having at least 4 carbon atoms and not more than 24 carbon atoms, and substituted in the 2,4,6 position;

If one selected a resin of the kind just described previously and reacted approximately one mole of the resin with two moles of formaldehyde and two moles of a basic hydroxylated polyamine as specified, following the same idealized over-simplification previously referred to, the resultant product might be illustrated thus:

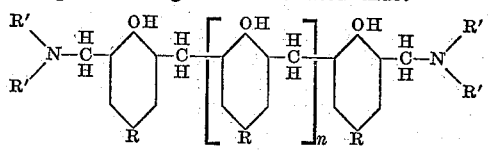

The basic hydroxylated amine may be designated thus:

In conducting reactions of this kind one does not necessarily obtain a hundred percent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

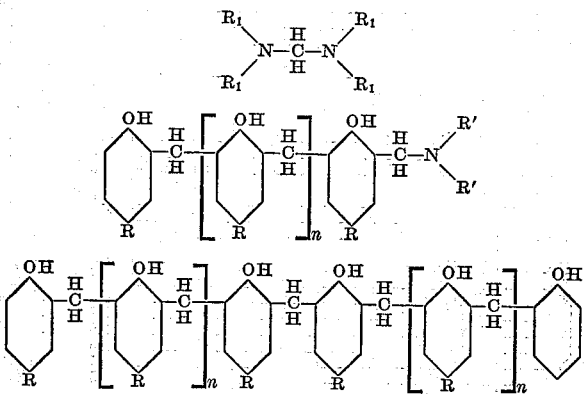

As has been pointed out previously, as far as the resin unit goes one can use a mole of aldehyde other than formaldehyde, such as acetaldehyde, propionaldehyde or butyraldehyde. The resin unit may be exemplified thus:

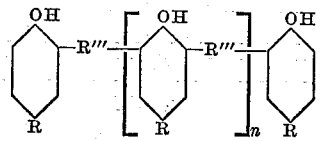

in which R''' is the divalent radical obtained from the particular aldehyde employed to form the resin. For reasons which are obvious the condensation product obtained appears to be described best in terms of the method of manufacture.

As previously stated the preparation of resins, the kind herein employed as reactants, is well known. See previously mentioned U.S. Patent 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i.e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins we found no reason for using other than those which are lowest in price and most readily available commercially. For purposes of convenience suitable resins are characterized in the following table:

TABLE III

| Example number | R | Position of R | R''' derived from | $n$ | Mol. Wt. of Resin Molecule (based on $n+2$) |
|---|---|---|---|---|---|
| 1a | Tertiary butyl | Para | Formaldehyde | 3.5 | 882.5 |
| 2a | Secondary butyl | Ortho | do | 3.5 | 882.5 |
| 3a | Tertiary amyl | Para | do | 3.5 | 959.5 |
| 4a | Mixed secondary and tertiary amyl | Ortho | do | 3.5 | 805.5 |
| 5a | Propyl | Para | do | 3.5 | 805.5 |
| 6a | Tertiary hexyl | do | do | 3.5 | 1,036.5 |
| 7a | Octyl | do | do | 3.5 | 1,190.5 |
| 8a | Nonyl | do | do | 3.5 | 1,267.5 |
| 9a | Decyl | do | do | 3.5 | 1,344.5 |
| 10a | Dodecyl | do | do | 3.5 | 1,498.5 |
| 11a | Tertiary butyl | do | Acetaldehyde | 3.5 | 945.5 |
| 12a | Tertiary amyl | do | do | 3.5 | 1,022.5 |
| 13a | Nonyl | do | do | 3.5 | 1,330.5 |
| 14a | Tertiary butyl | do | Butyraldehyde | 3.5 | 1,071.5 |
| 15a | Tertiary amyl | do | do | 3.5 | 1,148.5 |
| 16a | Nonyl | do | do | 3.5 | 1,456.5 |
| 17a | Tertiary butyl | do | Propionaldehyde | 3.5 | 1,008.5 |
| 18a | Tertiary amyl | do | do | 3.5 | 1,085.5 |
| 19a | Nonyl | do | do | 3.5 | 1,393.5 |
| 20a | Tertiary butyl | do | Formaldehyde | 4.2 | 996.6 |
| 21a | Tertiary amyl | do | do | 4.2 | 1,083.4 |
| 22a | Nonyl | do | do | 4.2 | 1,430.6 |
| 23a | Tertiary butyl | do | do | 4.8 | 1,094.4 |
| 24a | Tertiary amyl | do | do | 4.8 | 1,189.6 |
| 25a | Nonyl | do | do | 4.8 | 1,570.4 |
| 26a | Tertiary amyl | do | do | 1.5 | 604.0 |
| 27a | Hexyl | do | do | 1.5 | 653.0 |
| 28a | do | do | Acetaldehyde | 1.5 | 688.0 |
| 29a | Octyl | do | do | 1.5 | 786.0 |
| 30a | Nonyl | do | do | 1.5 | 835.0 |
| 31a | Octyl | do | Butyraldehyde | 2.0 | 986.0 |
| 32a | Nonyl | do | do | 2.0 | 1,028.0 |
| 33a | Amyl | do | do | 2.0 | 860.0 |
| 34a | Butyl | do | Formaldehyde | 2.0 | 636.0 |
| 35a | Amyl | do | do | 2.0 | 692.0 |
| 36a | Hexyl | do | do | 2.0 | 748.0 |

PART 5

As has been pointed out, the amine herein employed as a reactant is a hydroxylated basic polyamine and preferably a strongly basic polyamine having at least one secondary amino radical, free from primary amino groups, free from substituted imidazoline groups, and free from substituted tetrahydropyrimidine groups, in which the hydrocarbon radicals present, whether monovalent or divalent are alkyl, alicyclic, arylalkyl, or heterocyclic in character, subject of course to the inclusion of a hydroxyl group attached to a carbon atom which in turn is part of a monovalent or divalent radical.

Previous reference has been made to a number of polyamines which are satisfactory for use as reactants in the instant condensation procedure. They can be obtained by hydroxylation of low cost polyamines. The cheapest amines available are polyethylene amines and polypropylene amines. In the case of the polyethylene amines there may be as many as 5, 6 or 7 nitrogen atoms. Such amines are susceptible to terminal alkylation or the equivalent, i.e., reactions which convert the terminal primary amino group or groups into a secondary or tertiary amine radical. In the case of polyamines having at least 3 nitrogen atoms or more, both terminal groups could be converted into tertiary groups, or one terminal group could be converted into a tertiary group and the other into a secondary amine group. In the same way, the polyamines can be subjected to hydroxyalkylation by reaction with ethylene oxide, propylene oxide, glycide, etc. In some instances, depending on the structure, both types of reaction may be employed, i.e., one type to introduce a hydroxy ethyl group, for example, and another type to introduce a methyl or ethyl radical.

By way of example the following formulas are included. It will be noted they include such polyamines which, instead of being obtained from ethylene dichloride, propylene dichloride, or the like, are obtained from dichloroethyl ethers in which the divalent radical has a carbon atom chain interrupted by an oxygen atom:

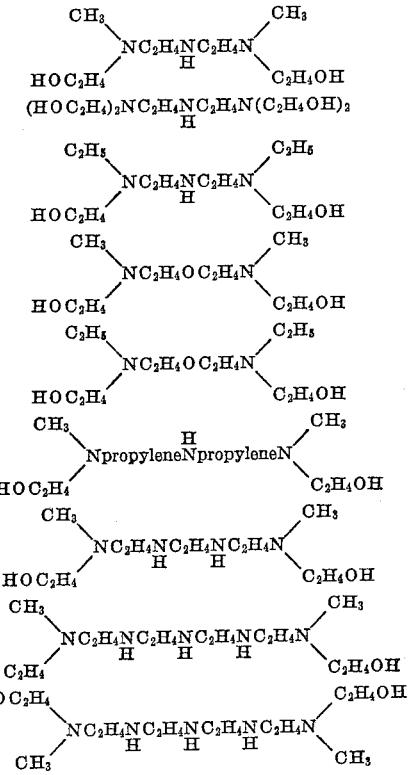

Another procedure for producing suitable polyamines is a reaction involving first an alkylene imine, such as ethylene imine or propylene imine, followed by an alkylene oxide, such as ethylene oxide, propylene oxide or glycide.

What has been said previously may be illustrated by reactions involving a secondary alkyl amine, or a secondary alicyclic amine, such as dibutylamine, dibenzylamine, dicyclohexylamine, or mixed amines with an imine so as to introduce a primary amino group which can be reacted with an alkylene oxide followed by reaction with an imine and then the use of an alkylene oxide again. Similarly, one can start with a primary amine and introduce two moles of an alkylene oxide so as to have a compound comparable to ethyl diethanolamine and react with two moles of an imine and then with two moles of ethylene oxide.

Reactions involving the same reactants previously described, i.e., a suitable secondary monoamine plus an alkylene imine plus an alkylene oxide, or a suitable monoamine plus an alkylene oxide plus an alkylene imine and plus the second introduction of an alkylene oxide, can be applied to a variety of primary amines. In the case of primary amines one can either employ two moles of an alkylene oxide so as to convert both amino hydrogen atoms into an alkanol group, or the equivalent; or else the primary amine can be converted into a secondary amine by the alkylation reaction. In any event, one can obtain a series of primary amines and corresponding secondary amines which are characterized by the fact that such amines include groups having repetitious ether linkages and thus introduce a definite hydrophile effect by virtue of the ether linkage. Suitable polyether amines susceptible to conversion in the manner described include those of the formula

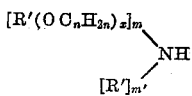

in which $x$ is a small whole number having a value of 1 or more, and may be as much as 10 or 12; $n$ is an integer having a value of 2 to 4, inclusive; $m$ represents the numeral 1 to 2; and $m'$ represents a number 0 to 1, with the proviso that the sum of $m$ plus $m'$ equals 2; and R' has its prior significance, particularly as a hydrocarbon radical.

The preparation of such amines has been described in the literature and particularly in two United States patents, to wit, U.S. Nos. 2,325,514, dated July 27, 1943, to Hester, and 2,355,337, dated August 8, 1944, to Spence. The latter patent describes typical haloalkyl ethers such as $$CH_3OC_2H_4Cl$$

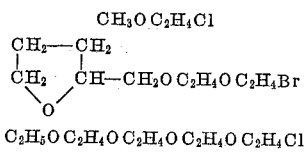

$$C_2H_5OC_2H_4OC_2H_4OC_2H_4Cl$$

Such haloalkyl ethers can react with ammonia, or with a primary amine such as methylamine, ethylamine, cyclohexylamine, etc., to produce a secondary amine of the kind above described, in which one of the groups attached to nitrogen is typified by R'. Such haloalkyl ethers also can be reacted with ammonia to give secondary amines as described in the first of the two patents mentioned immediately preceding. Monoamines so obtained and suitable for conversion into appropriate polyamines are exemplified by $$(CH_3OCH_2CH_2CH_2CH_2CH_2CH_2)_2NH$$

Other similar secondary monoamines equally suitable for such conversion reactions in order to yield appropriate secondary amines, are those of the composition

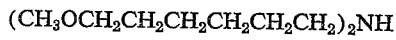

as described in U.S. Patent No. 2,375,659, dated May 8, 1945, to Jones et al. In the above formula R may be methyl, ethyl, propyl, amyl, octyl, etc.

Other suitable secondary amines which can be converted into appropriate polyamines can be obtained from products which are sold in the open market, such as may be obtained by alkylation of cyclohexylmethylamine or the alkylation of similar primary amines, or for that matter, amines of the kind described in U.S. Patent No. 2,482,546, dated September 20, 1949, to Kaszuba, provided there is no negative group or halogen attached to the phenolic nucleus. Examples include the following: beta-phenoxyethylamine, gamma-phenoxypropylamine, beta-phenoxy-alpha-methylethylamine, and beta-phenoxypropylamine.

Other secondary monoamines suitable for conversion into polyamines are the kind described in British Patent No. 456,517, and may be illustrated by $$C_{12}H_{25}-O-CH_2-CH_2-O-CH_2-CH_2-NH-CH_3$$

In light of the various examples of polyamines which have been used for illustration it may be well to refer again to the fact that previously the amine was shown as

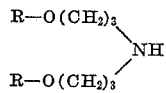

with the statement that such presentation is an oversimplification. It was pointed out that at least one occurrence of R' must include a secondary amino radical of the kind specified. Actually, if the polyamine radical contains two or more secondary amino groups the amine may be reactive at two different positions and thus the same amine may yield compounds in which R' and R' are dissimilar.

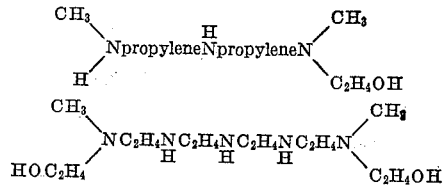

In the first of the two above formulas if the reaction involves a terminal amino hydrogen obviously the radicals attached to the nitrogen atom, which in turn combines with the methylene bridge, would be different than if the reaction took place at the intermediate secondary amino radical as differentiated from the terminal group. Again, referring to the second formula above, although a terminal amino radical is not involved it is obvious again that one could obtain two different structures for the radicals attached to the nitrogen atom united to the methylene bridge, depending on whether the reaction took place at either one of the two outer secondary amino groups, or at the central secondary amino group. If there are two points of reactivity towards formaldehyde as illustrated by the above examples it is obvious that one might get a mixture in which in part the reaction took place at one point and in part at another point. Indeed, there are well known suitable polyamine reactions where a large variety of compounds might be obtained due to such multiplicity of reactive radicals. This can be illustrated by the following formula:

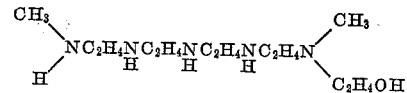

Certain hydroxylated polyamines which may be employed and which illustrate the appropriate type of reactant used for the instant condensation reaction may be illustrated by the following additional examples:

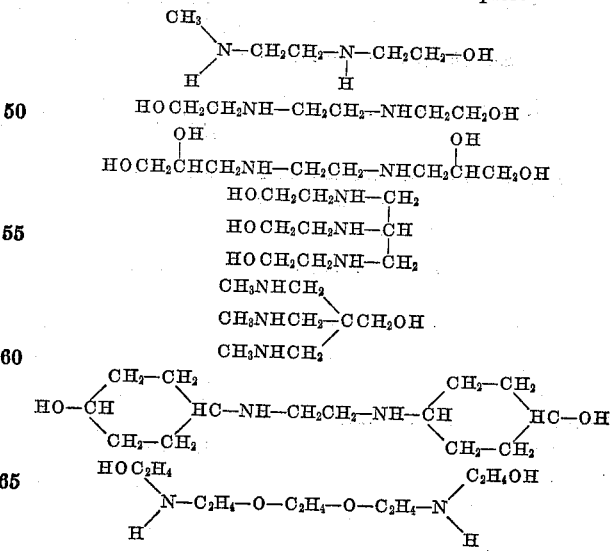

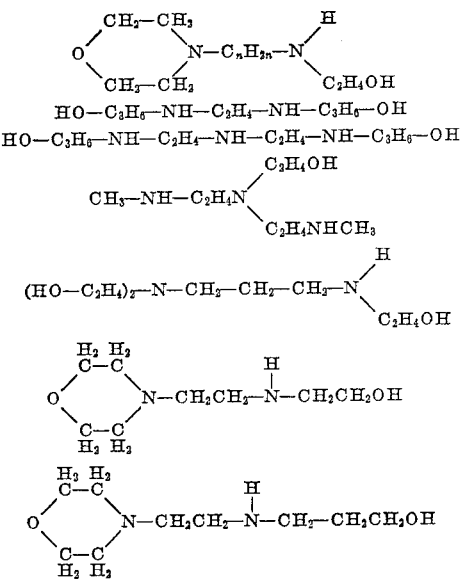

As is well known one can prepare ether amino alcohols of the type

RO—CH₂CH(OH)CH₂NHCH₂CH₂NHCH₂CH(OH)CH₂—OR in which R represents an alkyl group varying from methyl to normal decyl, and in fact, the group may contain as many as 15, 20 or even 30 carbon atoms. See J. Org. Chem., 17, 2 (1952).

Over and above the specific examples which have appeared previously, attention is directed to the fact that a number of suitable amines are included in subsequent Table IV.

PART 6

The products obtained by the herein described processes represented cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

Previous reference has been made to the fact that the procedure herein employed is comparable, in a general way, to that which corresponds to somewhat similar derivatives made either from phenols as differentiated from a resin, or in the manufacture of a phenol-amine-aldehyde resin; or else from a particularly selected resin and an amine and formaldehyde in the manner described in Bruson Patent No. 2,031,557 in order to obtain a heat-reactive resin. Since the condensation products obtained are not heat-convertible and since manufacture is not restricted to a single phase system, and since temperatures up to 150° C. or thereabouts may be employed, it is obvious that the procedure becomes comparatively simple. Indeed, perhaps no description is necessary over and above what has been said previously, in light of subsequent examples. However, for purpose of clarity the following details are included.

A convenient piece of equipment for preparation of these cogeneric mixtures is a resin pot of the kind described in aforementioned U.S. Patent No. 2,499,368. In mose instances the resin selected is not apt to be a fusible liquid at the early or low temperature stage of reaction if employed as subsequently described; in fact, usually it is apt to be a solid at distinctly higher temperatures, for instance, ordinary room temperature. Thus, we have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethylether of ethyleneglycol. One can also use a mixture of benzene or xylene and such oxygenated solvents. Note that the use of such oxygenated solvent is not required in the sense that it is not necessary to use an initial resin which is soluble only in any oxygenated solvent as just noted, and it is not necessary to have a single phase system for reaction.

Actually, water is apt to be present as a solvent for the reason that in most cases aqueous formaldehyde is employed, which may be the commercial product which is approximately 37%, or it may be diluted down to about 30% formaldehyde. However, paraformaldehyde can be used but it is more difficult perhaps to add a solid material instead of the liquid solution and, everything else being equal, the latter is apt to be more economical. In any event, water is present as water of reaction. If the solvent is completely removed at the end of the process, no problem is involved if the material is used for any subsequent reaction. However, if the reaction mass is going to be subjected to some further reaction where the solvent may be objectionable, as in the case of ethyl or hexyl alcohol, and if there is to be subsequent oxyalkylation, then, obviously, the alcohol should not be used or else it should be removed. The fact that an oxygenated solvent need not be employed, of course, is an advantage for reasons stated.

Another factor, as far as the selection of solvent goes, is whethehr or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost invariably a dark red in color or at least a red-amber, or some color which includes both an amber component and a reddish component. By and large, the melting point is apt to be lower and the products may be more sticky and more tacky than the original resin itself. Depending on the resin selected and on the amine selected the condensation product or reaction mass on a solvent-free basis may be hard, resinous and comparable to the resin itself.

The products obtained, depending on the reactants selected, may be water-insoluble or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

In the next succeeding paragraph it is pointed out that frequently it is convenient to eliminate all solvent, using a temperature of not over 150° C. and employing vacuum, if required. This applies, of course, only to those circumstances where it is desirable or necessary to remove the solvent. Petroleum solvents, aromatic solvents, etc., can be used. The selection of solvent, such as benzene, xylene or the like, depends primarily on cost, i.e., the use of the most economical solvent and also on three other factors, two of which have been previously mentioned; (a) is the solvent to remain in the reaction mass without removal?; (b) is the reaction mass to be subjected to further reaction in which the solvent, for instance, an alcohol, either low boiling or high boiling, might interfere as in the case of oxyalkylation?; and the third factor is this, (c) is an effort to be made to purify the reaction mass by the usual procedure as, for example, a water-wash to remove any unreacted water-soluble polyamine, if employed and present after reaction? Such procedures are well known and, needless to say, certain solvents are more suitable than others. Everything else being equal, we have found xylene the most satisfactory solvent.

We have found no particular advantage in using a low temperature in the early stage of the reaction because, and for reasons explained, this is not necessary although it does apply in some other procedures that, in a general way, bear some similarity to the present procedure. There is no objection, of course, to giving the reaction an opportunity to proceed as far as it will at some low temperature, for instance, 30° to 40° but ultimately one must employ the higher temperature in order to obtain products of the kind herein described. If a lower temperature reaction is used initially the period is not critical, in fact, it may be anything from a few hours up to 24 hours. We have not found any case where it was necessary or even desirable to hold the low temperature stage for more than 24 hours. In fact, we are not convinced there is any advantage in holding it at this stage for more than 3 or 4 hours at the most. This, again, is a matter of convenience largely for one reason. In heating and stirring the reaction mass there is a tendency for formaldehyde to be lost. Thus, if the reaction can be conducted at a lower temperature so as to use up part of the formaldehyde at such lower temperature, then the amount of unreacted formaldehyde is decreased subsequently and makes it easier to prevent any loss. Here, again, this lower temperature is not necessary by virtue of heat convertibility as previously referred to.

If solvents and reactants are selected so the reactants and products of reaction are mutually soluble, then agitation is required only to the extent that it helps cooling or helps distribution of the incoming formaldehyde. This mutual solubility is not necessary as previously pointed out but may be convenient under certain circumstances. On the other hand, if the products are not mutually soluble then agitation should be more vigorous for the reason that reaction probably takes place principally at the interfaces and the more vigorous the agitation the more interfacial area. The general procedure employed is invariably the same when adding the resin and the selected solvent, such as benzene or xylene. Refluxing should be long enough to insure that the resin added, preferably in a powdered form, is completely soluble. However, if the resin is prepared as such it may be added in solution form, just as preparation is described in aforementioned U.S. Patent 2,499,368. After the resin is in complete solution the polyamine is added and stirred. Depending on the polyamine selected, it may or may not be soluble in the resin solution. If it is not soluble in the resin solution it may be soluble in the aqueous formaldehyde solution. If so, the resin then will dissolve in the formaldehyde solution as added, and if not, it is even possible that the initial reaction mass could be a three-phase system instead of a two-phase system although this would be extremely unusual. This solution, or mechanical mixture, if not completely soluble is cooled to at least the reaction temperature or somewhat below, for example 35° C. or slightly lower, provided this initial low temperature stage is employed. The formaldehyde is then added in a suitable form. For reasons pointed out we prefer to use a solution and whether to use a commercial 37% concentration is simply a matter of choice. In large scale manufacturing there may be some advantage in using a 30% solution of formaldehyde but apparently this is not true on a small laboratory scale or pilot plant scale. 30% formaldehyde may tend to decrease any formaldehyde loss or make it easier to control unreacted formaldehyde loss.

Returning again to the preferred method of reaction and particularly from the standpoint of laboratory procedure employing a glass resin pot, when the reaction has proceeded as far as one can reasonably expect at a low temperature, for instance, after holding the reaction mass with or without stirring, depending on whether or not it is homogeneous, at 30° or 40° C., for 4 or 5 hours, or at the most, up to 10-24 hours, we then complete the reaction by raising the temperature up to 150° C., or thereabouts as required. The initial low temperature procedure can be eliminated or reduced to merely the shortest period of time which avoids loss of polyamine or formaldehyde. At a higher temperature we use a phase-separating trap and subject the mixture to reflux condensation until the water of reaction and the water of solution of the formaldehyde is eliminated. We then permit the temperature to rise to somewhere about 100° C., and generally slightly above 100° C., and below 150° C. by eliminating the solvent or part of the solvent so the reaction mass stays within this predetermined range. This period of heating and refluxing, after the water is eliminated, is continued until the reaction mass is homogeneous and then for one to three hours longer. The removal of the solvents is conducted in a conventional manner in the same way as the removal of solvents in resin manufacture as described in aforementioned U.S. Patent No. 2,499,368.

Needless to say, as far as the ratio of reactants goes we have invariably employed approximately one mole of the resin based on the molecular weight of the resin molecule, 2 moles of the secondary polyamine and 2 moles of formaldehyde. In some instances we have added a trace of caustic as an added catalyst but have found no particular advantage in this. In other cases we have used a slight excess of formaldehyde and, again, have not found any particular advantage in this. In other cases we have used a slight excess of amine and, again, have not found any particular advantage in so doing. Whenever feasible we have checked the completeness of reaction in the usual ways, including the amount of water of reaction, molecular weight, and particularly in some instances have checked whether or not the end-product showed surface-activity, particularly in a dilute acetic acid solution. The nitrogen content after removal of unreacted polyamine, if any is present, is another index.

In light of what has been said previously little more need be said as to the actual procedure employed for the preparation of the herein described condensation products. The following example will serve by way of illustration:

*Example 1b*

The phenol-aldehyde resin is the one that has been identified previously as Example 1a. It was obtained from a para-tertiary butylphenol and formaldehyde. The resin was prepared using an acid catalyst which was completely neutralized at the end of the reaction. The molecular weight of the resin was 882.5. This corresponded to an average of about 3½ phenolic nuclei as the value for $n$ which excludes the 2 external nuclei, i.e., the resin was largely a mixture having 3 nuclei and 4 nuclei, excluding the 2 external nuclei, or 5 and 6 overall nuclei. The resin so obtained in a neutral state had a light amber color.

882 grams of the resin identified as 1a preceding, were powdered and mixed with a considerably lesser weight of xylene, to wit, 500 grams. The mixture was refluxed until solution was complete. It was then adjusted to approximately 33° to 38° C., and 296 grams of symmetrical di(hydroxyethyl)ethylenediamine were added. The mixture was stirred vigorously and formaldehyde used was a 30% solution and the amount employed was 200 grams. It was added in a little over 3 hours. The mixture was stirred vigorously and kept within a temperature range of 33° to 48° C. for about 17 hours. At the end of this time it was refluxed using a phase-separating trap and a small amount of aqueous distillate withdrawn from time to time. The presence of formaldehyde was noted. Any unreacted formaldehyde seemed to disappear within about 3 hours or thereabouts. As soon as the odor of formaldehyde was no longer particularly noticeable or detectible the phase-separating trap was set so as to eliminate part of the xylene was removed until the temperature reached approximately 150° C. or perhaps a little higher. The reaction mass was kept at this temperature for a little over 4 hours and the reaction stopped. During this time any additional water, which was probably water of reaction which had formed, was eliminated by means of the trap. The residual xylene was permitted to stay in the cogeneric mixture. A small amount of the sample was heated on a water bath to remove the excess xylene. The residual material was dark red in color and had the consistency of a sticky fluid or tacky resin. The overall time for reaction was somewhat under 30 hours. In other examples it varied from 24 to more than 36 hours. The time can be reduced by cutting the low temperature period to approximately 3 to 6 hours. Note that in Table IV following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C., or thereabouts. Usually the mixture yielded a clear solution by the time the bulk of the water, or all of the water, had been removed.

Note that as pointed out previously, this procedure is illustrated by 24 examples in Table IV.

As to the formulas of the above amines referred to as Amine A through Amine I, inclusive, see immediately following:

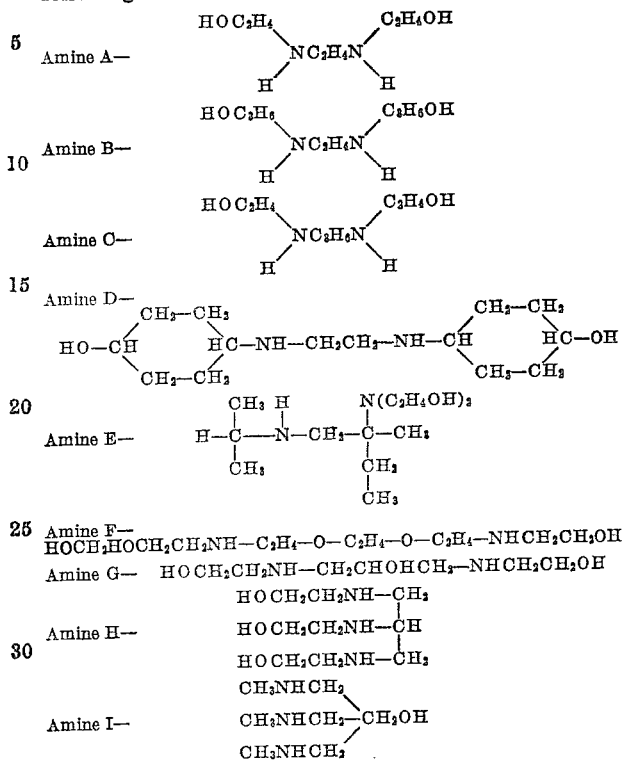

PART 7

The products obtained as herein described by reactions involving amine condensates and diglycidyl ethers or the equivalent are valuable for use as such. This is pointed out in detail elsewhere. However, in many instances the derivatives obtained by oxyalkylation are even more valuable and from such standpoint the herein described products may be considered as valuable intermediates. Subsequent oxyalkylation involves the use of ethylene oxide, propylene oxide, butylene oxide, glycide, etc. Such oxyalkylating agents are monoepoxides as differentiated from polyepoxides.

TABLE IV

| Ex. No. | Resin used | Amt., grs. | Amine used and amount | Strength of formaldehyde soln. and amt. | Solvent used and amt. | Reaction temp., °C. | Reaction time, hrs. | Max. distill. temp., °C. |
|---|---|---|---|---|---|---|---|---|
| 1b | 1a | 882 | Amine A 296 g | 30% 200 g | Xylene 500 g | 21-24 | 24 | 150 |
| 2b | 3a | 480 | Amine A 148 g | 37% 81 g | Xylene 480 g | 20-23 | 27 | 156 |
| 3b | 8a | 633 | Amine A 148 g | 37% 81 g | Xylene 610 g | 22-27 | 25 | 142 |
| 4b | 1a | 441 | Amine B 176 g | 30% 100 g | Xylene 300 g | 20-25 | 28 | 145 |
| 5b | 3a | 480 | Amine B 176 g | 37% 81 g | Xylene 425 g | 23-27 | 34 | 150 |
| 6b | 8a | 633 | Amine B 176 g | 30% 100 g | Xylene 500 g | 25-27 | 30 | 152 |
| 7b | 1a | 882 | Amine C 324 g | 37% 162 g | Xylene 625 g | 23-26 | 38 | 141 |
| 8b | 3a | 480 | Amine C 162 g | 30% 100 g | Xylene 315 g | 20-21 | 25 | 143 |
| 9b | 8a | 633 | Amine C 162 g | 30% 100 g | Xylene 535 g | 23-24 | 25 | 140 |
| 10b | 11a | 473 | Amine D 256 g | 30% 100 g | Xylene 425 g | 22-25 | 25 | 148 |
| 11b | 12a | 511 | Amine D 256 g | 30% 100 g | Xylene 450 g | 20-21 | 25 | 158 |
| 12b | 13a | 665 | Amine D 256 g | 30% 100 g | Xylene 525 g | 21-25 | 28 | 152 |
| 13b | 1a | 441 | Amine E 208 g | 37% 81 g | Xylene 400 g | 22-24 | 26 | 143 |
| 14b | 3a | 480 | Amine E 208 g | 37% 81 g | Xylene 500 g | 25-27 | 36 | 144 |
| 15b | 7a | 595 | Amine E 208 g | 37% 81 g | Xylene 400 g | 26-27 | 34 | 141 |
| 16b | 1a | 441 | Amine F 236 g | 37% 81 g | Xylene 400 g | 21-23 | 25 | 153 |
| 17b | 3a | 480 | Amine F 236 g | 37% 81 g | Xylene 500 g | 20-22 | 28 | 150 |
| 18b | 12a | 511 | Amine F 236 g | 37% 81 g | Xylene 400 g | 23-25 | 27 | 155 |
| 19b | 20a | 498 | Amine G 172 g | 37% 81 g | Xylene 450 g | 20-21 | 34 | 150 |
| 20b | 21a | 542 | Amine G 172 g | 37% 81 g | Xylene 500 g | 20-24 | 36 | 152 |
| 21b | 23a | 547 | Amine H 221 g | 37% 81 g | Xylene 400 g | 20-22 | 30 | 148 |
| 22b | 1a | 441 | Amine H 221 g | 37% 81 g | Xylene 400 g | 20-29 | 24 | 143 |
| 23b | 24a | 595 | Amine I 172 g | 37% 81 g | Xylene 450 g | 20-22 | 32 | 151 |
| 24b | 25a | 391 | Amine I 86 g | 30% 50 g | Xylene 300 g | 20-26 | 36 | 147 |

It becomes apparent that if the product obtained is to be treated subsequently with a monoepoxide which may require a pressure vessel as in the case of ethylene oxide, it is convenient to use the same reaction vessel in both instances. In other words, the 2 moles of the amine-modified phenol-aldehyde resin condensate would be reacted with a polyepoxide and then subsequently with a monoepoxide. In any event, if desired the polyepoxide reaction can be conducted in an ordinary reaction vessel, such as the usual glass laboratory equipment. This is particularly true of the kind used for resin manufacture as described in a number of patents, as for example, U.S. Patent No. 2,499,365.

Cognizance should be taken of one particular feature in connection with the reaction involving the polyepoxide and that is this; the amine-modified phenol-aldehyde resin condensate is invariably basic and thus one need not add the usual catalysts which are used to promote such reactions. Generally speaking, the reaction will proceed at a satisfactory rate under suitable conditions without any catalyst at all.

Employing polyepoxides in combination with a non-basic reactant the usual catalyst include alkaline materials such as caustic soda, caustic potash, sodium methylate, etc. Other catalysts may be acidic in nature and are of the kind characterized by iron and tin chloride. Furthermore, insoluble catalysts such as clays or specially prepared mineral catalysts have been used. If for any reason the reaction did not proceed rapidly enough with the diglycidyl ether or other analogous reactant, then a small amount of finely divided caustic soda or sodium methylate could be employed as a catalyst. The amount generally employed would be 1% or 2%.

It goes without saying that the reaction can take place in an inert solvent, i.e., one that is not oxyalkylation-susceptible. Generally speaking, this is more conveniently an aromatic solvent such as xylene or a higher boiling coal tar solvent, or else a similar high boiling aromatic solvent obtained from petroleum. One can employ an oxygenated solvent such as the diethylether of ethylene glycol, or the diethylether or propylene glycol, or similar ethers, either alone or in combination with a hydrocarbon solvent. The selection of the solvent depends in part on the subsequent use of the derivatives or reaction products. If the reaction products are to be rendered solvent-free and it is necessary that the solvent be readily removed as, for example, by the use of vacuum distillation, thus xylene or an aromatic petroleum will serve. If the product is going to be subjected to oxyalkylation subsequently, then the solvent should be one which is not oxyalkylation-susceptible. It is easy enough to select a suitable solvent if required in any instance but, everything else being equal, the solvent chosen should be the most economical one.

*Example 1C*

The product was obtained by reaction between the diepoxide previously designated as diepoxide 3A, and condensate 2b. Condensate 2b was obtained from resin 3a.

Resin 3a was obtained from tertiary amylphenol and formaldehyde. The amount of resin employed was 480 grams. The amount of amine employed (Amine A) was 148 grams. The amount of 37% formaldehyde employed was 81 grams. The amount of solvent employed was 480 grams. Amine A, as previously indicated at the end of Table IV, preceding, was symmetrical di(hydroxyethyl)ethylene diamine. All this has been described previously.

The solution of the condensate in xylene was adjusted to a 50% concentration. In this particular instance, and in practically all the others which appear in the subsequent table, the examples are characterized by the fact that no alkaline catalyst was added. The reason is, of course, that the condensate as such is strongly basic. If desired, a small amount of alkaline catalyst could be added, such as finely powdered caustic soda, sodium methylate, etc. If such alkaline catalyst is added it may speed up the reaction but it also may cause an undesirable reaction, such as the polymerization of the diepoxide.

In any event, 128 grams of the condensate were dissolved in approximately an equal weight of xylene and stirred and heated to 100° C. 17 grams of the diepoxide previously identified as 3A, and dissolved in an equal weight of xylene, were added dropwise. The initial addition of the xylene solution carried the temperature above 109° C. The remainder of the diepoxide was added in about an hour's time. During this period of time the temperature rose somewhere above 120° C. The product was allowed to reflux at about 130° C., using a phase-separating trap. A small amount of xylene was removed by means of the phase-separating trap as the temperature gradually rose to 170° C. or slightly less. The mixture was then refluxed at about this same temperature for about 4 or 5 hours until the reaction had stopped and the xylene which had been separated out during the reflux period, was returned to the mixture. The overall reaction time was about 7 hours. A small amount of material was withdrawn and the xylene evaporated on a hot plate in order to examine the physical properties. The material was a dark red viscuous semi-solid. It was insoluble in water, it was insoluble in a 5% gluconic acid solution, and it was soluble in xylene, and particularly in a mixture of 80 parts xylene and 20 parts methanol. However, if the material was dissolved in an oxygenated solvent and then shaken with 5% gluconic acid it showed a definite tendency to disperse, suspend, or form a sol and particularly in a xylene-methanol mixed solvent as previously described, with or without the further addition of a little acetone.

The procedure employed of course is simple in light of what has been said previously and in effect is a procedure similar to that employed in the use of glycide or methylglycide, as oxyalkylating agents. See, for example Part 1 of U.S. Patent No. 2,602,062 dated July 1, 1952, to De Groote.

Various examples obtained in substantially the same manner are enumerated in the following tables:

TABLE V

| Ex. No. | Condensate used | Amt., grs. | Diepoxide used | Amt., grs. | Xylene, grs. | Molar ratio | Time of reaction, hrs. | Max. temp., °C. | Color and physical state |
|---|---|---|---|---|---|---|---|---|---|
| 1C | 2b | 128 | 3A | 17 | 145 | 2:1 | 7 | 170 | Dark semi-solid |
| 2C | 5b | 134 | 3A | 17 | 150 | 2:1 | 8 | 168 | Do. |
| 3C | 7b | 123 | 3A | 17 | 140 | 2:1 | 7 | 175 | Do. |
| 4C | 8b | 130 | 3A | 17 | 147 | 2:1 | 7 | 172 | Do. |
| 5C | 10b | 148 | 3A | 17 | 165 | 2:1 | 8 | 168 | Do. |
| 6C | 12b | 187 | 3A | 17 | 204 | 2:1 | 8 | 175 | Dark solid mass |
| 7C | 13b | 132 | 3A | 17 | 150 | 2:1 | 8 | 168 | Do. |
| 8C | 18b | 152 | 3A | 17 | 170 | 2:1 | 8 | 170 | Do. |
| 9C | 19b | 136 | 3A | 17 | 153 | 2:1 | 8 | 165 | Do. |
| 10C | 20b | 145 | 3A | 17 | 162 | 2:1 | 8 | 170 | Do. |

Solubility in regard to all these compounds was substantially similar to that which was described in Example 1C.

TABLE VI

| Ex. No. | Condensate used | Amt., grs. | Diepoxide used | Amt., grs. | Xylene, grs. | Molar ratio | Time of reaction, hrs. | Max. temp., °C. | Color and physical state |
|---|---|---|---|---|---|---|---|---|---|
| 1D | 2b | 128 | B1 | 27.5 | 156 | 2:1 | 7 | 165 | Dark semi-solid |
| 2D | 5b | 134 | B1 | 27.5 | 162 | 2:1 | 7 | 170 | Do. |
| 3D | 7b | 123 | B1 | 27.5 | 150 | 2:1 | 7 | 170 | Do. |
| 4D | 8b | 130 | B1 | 27.5 | 158 | 2:1 | 7 | 175 | Do. |
| 5D | 10b | 148 | B1 | 27.5 | 176 | 2:1 | 8 | 172 | Do. |
| 6D | 12b | 187 | B1 | 27.5 | 215 | 2:1 | 8 | 168 | Dark solid mass |
| 7D | 13b | 132 | B1 | 27.5 | 160 | 2:1 | 7 | 170 | Do. |
| 8D | 18b | 152 | B1 | 27.5 | 180 | 2:1 | 8 | 175 | Do. |
| 9D | 19b | 136 | B1 | 27.5 | 164 | 2:1 | 8 | 165 | Do. |
| 10D | 20b | 145 | B1 | 27.5 | 173 | 2:1 | 8 | 180 | Do. |

Solubility in regard to all these compounds was substantially similar to that which was described in Example 1C.

TABLE VII

| Ex. No. | Resin condensate used | Probable mol. wt. of reaction product | Amt. of product, grs. | Amt. of solvent, grs. | Probable number of hydroxyls per molecule |
|---|---|---|---|---|---|
| 1C | 2b | 2,900 | 2,900 | 1,450 | 19 |
| 2C | 5b | 3,010 | 3,000 | 1,495 | 19 |
| 3C | 7b | 2,800 | 2,800 | 1,400 | 19 |
| 4C | 8b | 2,960 | 2,950 | 1,470 | 19 |
| 5C | 10b | 3,300 | 3,305 | 1,655 | 19 |
| 6C | 12b | 4,070 | 4,070 | 2,035 | 19 |
| 7C | 13b | 2,980 | 2,980 | 1,490 | 19 |
| 8C | 18b | 3,380 | 3,390 | 1,700 | 19 |
| 9C | 19b | 3,070 | 3,065 | 1,530 | 20 |
| 10C | 20b | 3,240 | 3,240 | 1,620 | 20 |

TABLE VIII

| Ex. No. | Resin condensate used | Probable mol. wt. of reaction product | Amt. of product, grs. | Amt. of solvent, grs. | Probable number of hydroxyls per molecule |
|---|---|---|---|---|---|
| 1D | 2b | 3,110 | 3,115 | 1,560 | 19 |
| 2D | 5b | 3,220 | 3,220 | 1,610 | 19 |
| 3D | 7b | 3,010 | 3,000 | 1,495 | 19 |
| 4D | 8b | 3,170 | 3,165 | 1,580 | 19 |
| 5D | 10b | 3,510 | 3,500 | 1,745 | 19 |
| 6D | 12b | 4,280 | 4,290 | 2,150 | 19 |
| 7D | 13b | 3,190 | 3,200 | 1,605 | 19 |
| 8D | 18b | 3,590 | 3,580 | 1,785 | 19 |
| 9D | 19b | 3,280 | 3,280 | 1,640 | 20 |
| 10D | 20b | 3,450 | 3,455 | 1,730 | 20 |

At times we have found a tendency for an insoluble mass to form or at least to obtain incipient cross-linking or gelling even when the molal ratio is in order of 2 moles of resin to one of diepoxide. We have found this can be avoided by any one of the following procedures or their equivalent. Dilute the resin or the diepoxide, or both, with an inert solvent, such as xylene or the like. In some instances an oxygenated solvent, such as the diethyl ether of ethyleneglycol may be employed. Another procedure which is helpful is to reduce the amount of catalyst used, or reduce the temperature of reaction by adding a small amount of initially lower boiling solvent such as benzene, or use benzene entirely. Also, we have found it desirable at times to use slightly less than apparently the theoretical amount of diepoxide, for instance, 90% or 95% instead of 100%. The reason for this fact may reside in the possibility that the molecular weight dimensions on either the resin molecule or the diepoxide molecule may actually vary from the true molecular weight by several percent.

Previously the condensates has been depicted in a simplified form which, for convenience, may be shown thus:

$$(\text{Amine}) CH_2 (\text{Resin}) CH_2 (\text{Amine})$$

Following such simplification the reaction product with a polyepoxide and particularly a diepoxide, would be indicated thus:

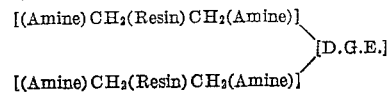

in which D.G.E. represents a diglycidyl ether as specified. If the amine happened to have more than one reactive hydrogen, as in the case of a hydroxylated amine or polyamine, having a multiplicity of secondary amino groups it is obvious that other side reactions could take place as indicated by the following formulas:

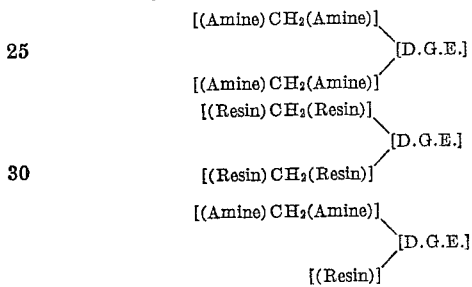

All the above indicates the complexity of the reaction product obtained after treating the amine-modified resin condensate with a polyepoxide and particularly diepoxide as herein described.

PART 8

The preparation of the compounds or products described in Part 7, preceding, involves an oxyalkylating agent, to wit, a polyepoxide and usually a diepoxide. The procedure described in the present part is a further oxyalkylation step but involves the use of a monoepoxide or the equivalent. The principal difference is only that while polyepoxides are invariably nonvolatile and can be reacted under a condenser, at least numerous monoepoxides and particularly ethylene oxide, propylene oxide, butylene oxide, etc., involve somewhat different operating conditions. Glycide and methylglycide react under practically the same conditions as the polyepoxides. Actually, for purpose of convenience, it is most desirable to conduct the previous reaction, i.e., the one involving the polyepoxide, in equipment such that subsequent reaction with monoepoxides may follow without interruption. In the oxyalkylations carried out to produce compositions used in accordance with the present application, conventional equipment, i.e., a stainless steel autoclave suitably equipped, and conventional oxyalkylation conditions were used.

The amount of monoepoxides employed may be as high as 50 parts of monoepoxide for one part of the polyepoxide treated amine-modified phenol-aldehyde condensation product.

*Example 1E*

The polyepoxide-derived oxyalkylation-susceptible compound employed is the one previously designated and described as Example 1D. Polyepoxides-derived condensate 1D was obtained, in turn, from condensate 2b and diepoxide B1. Reference to Table IV shows the composition of condensate 2b. Table IV shows it was obtained from Resin 5a, Amine A and formaldehyde. Amine A is symmetrical di(hydroxyethyl)-ethylene diamine. Table III shows that Resin 5a was obtained from tertiary amylphenol and formaldehyde.

For purpose of convenience, reference herein and in the tables to the oxyalkylation-susceptible compound will be abbreviated in the table heading as "OSC"; reference is to the solvent-free material since, for convenience, the amount of solvent is noted in a second column. Actually, part of the solvent may have been present and in practically every case was present in either the resinification process or the condensation process, or in treatment with a polyepoxide. In any event, the amount of solvent present at the time of treatment with a monoepoxide is indicated as a separate item. To be consistent, of course, the oxyalkylation-susceptible compound abbreviated as "OSC" is indicated on a solvent-free basis.

15.55 pounds of the polyepoxide-derived condensate were mixed with 15.60 pounds of solvent (xylene in this series) along with one pound of finely powdered caustic soda as a catalyst. This reaction mixture was treated with 7.75 pounds of ethylene oxide. At the end of the reaction period the molal ratio of oxide to initial compound was approximately 15.6 and the theoretical molecular weight was approximately 4650.

Adjustment was made in the autoclave to operate at a temperature of 125° to 130° C., and at a pressure of 10 to 15 pounds per square inch.

The time regulator was set so as to inject the ethylene oxide in approximately one-half hour and then continued stirring for one-half hour longer simply as a precaution to insure complete reaction. The reaction went readily and, as a matter of fact, the ethylene oxide could have been injected in probably 15 minutes instead of a half-hour and the subsequent time allowed to insure completion of reaction. The reaction went readily and, as a matter of fact, the ethylene oxide could have been injected in probably 15 minutes instead of a half-hour and the subsequent time allowed to insure completion of reaction may have been entirely unnecessary. The speed of reaction, particularly at the low pressure, undoubtedly was due in a large measure to the excellent agitation and also to the comparatively high concentration of catalyst. The amount of ethylene oxide introduced, as previously noted, was 7.75 pounds.

A comparatively small sample, less than 50 grams, was withdrawn merely for examination as far as solubility or emulsifying power was concerned, and also for the purpose of making some tests on various oil field emulsions. The amount withdrawn was so small that no cognizance of this fact is included in the data or subsequent data, or in data reported in tabular form in subsequent Tables IX, X and XI.

The size of the autoclave employed was 35 gallons. In innumerable oxyalkylations we have withdrawn a substantial portion at the end of each step and continued oxyalkylation on a partial residual sample. This was not the case in this particular series. Certain examples were duplicated as hereinafter noted and subjected to oxyalkylation with a different oxide.

*Example 2E*

This example simply illustrates further oxyalkylation of Example 1E, preceding. The oxyalkylation-susceptible compound, to wit, Example 1D, is the same one as was used in Example 1E, preceding, because it is merely a continuation. In the subsequent tables, such as Table IX, the oxyalkylation-susceptible compound in the horizontal line concerned with Example 2E refers to oxyalkylation-susceptible compound, Example 1D. Actually, one could refer just as properly to Example 1E at this stage. It is immaterial which designation is used so long as it is understood and such practice is used consistently throughout the tables. In any event, the amount of ethylene oxide is the same as before, to wit, 7.75 pounds. This means the amount of oxide at the end was 15.5 pounds. It is meant that the ratio of oxide to oxyalkylation-susceptible compound (molar basis) at the end was 70 to 1. The theoretical molecular weight was almost 6,200. There was no added solvent. In other words, it remained the same, that is, 15.60 pounds, and there was no added catalyst. The entire procedure was substantially the same as in Example 1E, preceding.

In all succeeding examples the time and pressure were the same as previously, to wit, 125° to 130° C., and the pressure 10 to 15 pounds. The time element was one-half hour, the same as before.

*Example 3E*

The oxyethylation proceeded in the same manner as described in Examples 1E and 2E. There was no added solvent and no added catalyst. The oxide added was 7.75 pounds. The total oxide at the end of the oxyalkylation procedure was 23.25 pounds. The molal ratio of oxide to condensate was 105 to 1. The theoretical molecular weight was approximately 7,750. As previously noted, conditions in regard to temperature and pressure were the same as in Examples 1E and 2E. The time period was 45 minutes.

*Example 4E*

The oxyethylation was continued and the amount of oxide added was the same as before, to wit, 7.75 pounds. The amount of oxide added at the end of the reaction was 31.0. There was no added solvent and no added catalyst. Conditions as far as temperature and pressure are concerned were the same as in previous examples. The time period was slightly longer, to wit, one hour. The reaction at this point showed modest, if any, tendency to slow up. The molal ratio of oxide to oxyalkylation-susceptible compound was about 140 to 1 and the theoretical molecular weight was 9,300.

*Example 5E*

The oxyalkylation was continued with the introduction of 15.5 pounds of oxide. The amount of oxide at the end of this period was 46.5 pounds. No added solvent was introduced, and likewise no added catalyst was introduced. The theoretical molecular weight at the end of the reaction was approximately 12,500. The molal ratio of oxide to oxyalkylation-susceptible compound was 210 to 1. The time period was two hours.

*Example 6E*

The same procedure was followed as in the previous examples without addition of either more catalyst or more solvent. The amount of oxide added was the same as before, to wit, 15.5 pounds. The time required to complete the reaction was two and one-half hours. The total amount of oxide at the end of the period was 62 pounds. At the end of the reaction the ratio of oxide to oxyalkylation-susceptible compound was approximately 280 to 1, and the theoretical molecular weight was about 15,500.

The same procedure as described in the previous examples was employed in connection with a number of the other condensations described previously. All these data have been presented in tabular form in Tables IX through XIV, inclusive.

In substantially every case a 35-gallon autoclave was employed, although in some instances the initial oxyethylation was started in a 15-gallon autoclave and then transferred to a 25-gallon autoclave. This is immaterial but happened to be a matter of convenience only. The solvent used in all cases was xylene. The catalyst used was finely powdered caustic soda.

Referring now to Tables IX, X and XI, it will be noted that compounds 1E through 18E were obtained by the use of ethylene oxide, whereas Examples 19E through 36E were obtained by the use of propylene oxide; and Examples 37E through 54E were obtained by the use of butylene oxide.

Referring now to Table X specifically, it will be noted that the series of examples beginning with 1F were obtained, in turn, by use of both ethylene and propylene oxides, using ethylene first; in fact, using Example 3E as the oxyalkylation-susceptible compound in the first six examples. This applies to series 1F through 18F.

Similarly, series 19F through 36F involve the use of both propylene oxide and ethylene oxide in which the propylene oxide was used first, to wit, 19F was prepared from 24E, a compound which was initially derived by use of propylene oxide.

Similarly, Examples 37F through 54F involve the use of ethylene oxide and butylene oxide, the ethylene oxide being used first. Also, these two oxides were used in the series 55F through 72F, but in this latter instance the butylene oxide was used first and then the ethylene oxide.

Series 73F through 90F involve the use of propylene oxide and butylene oxide, butylene oxide being used first and propylene oxide being used next.

In series 1G through 18G the three oxides were used. It will be noted in Example 1G the initial compound was 78F; Example 78F, in turn, was obtained from a compound in which butylene oxide was used initially and then propylene oxide. Thus, the oxide added in the series 1G through 6G was by use of ethylene oxide as indicated in Table XI.

Referring to Table XI, in regard to Example 19G it will be noted again that the three oxides were used and 19G was obtained from 58F. Example 58F, in turn, was obtained by using butylene oxide first and then ethylene oxide. In Example 19G and subsequent examples, such as 20G, 21G, etc., propylene oxide was added.

Tables XII, XIII and XIV give the data in regard to the oxyalkylation procedure as far as temperature and pressure are concerned and also give some data as to solubility of the oxyalkylated derivative in water, xylene and kerosene.

Referring to Table IX in greater detail, the data are as follows: The first column gives the example numbers, such as 1E, 2E, 3E and 4E, etc.

The fifth column can be ignored for the reason that it is concerned with propylene oxide only, and the sixth column can be ignored for the reason that it is concerned with butylene oxide only.

The seventh column shows the catalyst which is invariably powdered caustic soda. The quantity used is indicated.

The eighth column shows the amount of solvent which is xylene unless otherwise stated.

The ninth column shows the amount of oxyalkylation-susceptible compound which in this series is the polyepoxide-derived condensate.

The tenth column shows the amount of ethylene oxide in at the end of the particular step.

Column eleven shows the same data for propylene oxide, and column twelve for butylene oxide. For obvious reasons these can be ignored in the series 1E through 18E.

Column thirteen shows the amount of the catalyst at the end of the oxyalkylation step, and column fourteen shows the amount of solvent at the end of the oxyalkylation step.

The fifteenth, sixteenth and seventeenth columns are concerned with molal ratio of the individual oxides to the oxyalkylation-susceptible compound. Data appears only in column fifteen for the reason, previously noted, that no butylene or propylene oxide were used in the present instance.

The theoretical molecular weight appears at the end of the table which is on the assumption, as previously noted, as to the probable molecular weight of the initial compound, and on the assumption that all oxide added during the period combined. This is susceptible to limitations that have been pointed out elsewhere, particularly in the patent literature.

Referring now to the second series of compounds in Table IX, to wit, Examples 19E through 36E, the situation is the same except that it is obvious the oxyalkylating agent used was propylene oxide and not ethylene oxide. Thus, the fourth column becomes a blank and the tenth column becomes a blank and the fifteenth column becomes a blank, but column five, which previously was a blank in Table IX now carries data as to the amount of propylene oxide present at the beginning of the reaction. Column eleven carries data as to the amount of propylene oxide present at the end of the reaction, and column sixteen carries data as to the ratio of propylene oxide to the oxyalkylation-susceptible compound. In all other instances the various headings have the same significance as previously.

Similarly, referring to Examples 37E through 54E in Table IX, columns four and five are blanks, columns ten and eleven are blanks, and columns fifteen and sixteen are blanks, but data appear in column six as to butylene oxide present before the particular oxyalkylation step. Column twelve gives the amount of butylene oxide present at the end of the step, and column seventeen gives the ratio of butylene oxide to oxyalkylation-susceptible compound.

Table X is in essence the data presented in exactly the same way except the two oxides appear, to wit, ethylene oxide and propylene oxide. This means that there are only three columns in which data does not appear, all three being concerned with the use of butylene oxide. Furthermore, it shows which oxide was used first by the very fact that reference to Example 1F, in turn, refers to 3E, and also shows that ethylene oxide was present at the very first stage. Furthermore, for ease of comparison and also to be consistent, the data under Molal Ratio in regard to ethylene oxide and propylene oxide goes back to the original diepoxide-derived condensate 1D. This is obvious, of course, because the figures 105.6 and 17.25 coincide with the figures for 1E derived from 1D, as shown in Table IX.

In Table X the same situation is involved except, of course, propylene oxide is used first and this, again, is perfectly apparent. Three columns only are blank, to wit, the three referring to butylene oxide. The same situation applies in examples such as 37F and subsequent examples where the two oxides used are ethylene oxide and butylene oxide, and the table makes it plain that ethylene oxide was used first. Inversely, Example 55F and subsequent examples show the use of the same two oxides but with butylene oxide being used first as shown on the table.

Example 73F and subsequent examples relate to the use of propylene oxide and butylene oxide. Examples beginning wth 1G, Table XI, particularly 2G, 3G, etc., show the use of all three oxides so there are no blanks as in the first step of each stage where one oxide is missing. It is not believed any further explanation need be offered in regard to Table XI.

As previously pointed out certain initial runs using one oxide only, or in some instances two oxides, had to be duplicated when used as intermediates subsequently for further reaction. It would be confusing to refer in too much detail in these various tables for the reason that all pertinent data appear and the tables are essentially self-explanatory.

Reference to solvent and amount of alkali at any point takes into consideration the solvent from the previous step and the alkali left from this step. As previously pointed out, Tables XII, XIII and XIV give operating data in connection with the entire series, comparable to what has been said in regard to Examples 1E thorugh 6E.

The products resulting from these procedures may contain modest amounts, or have small amounts, of the solvents as indicated by the figures in the tables. If desired, the solvent may be removed by distillation, and particularly vacuum distillation. Such distillation also may remove traces or small amounts of uncombined oxide, if present and volatile under the conditions employed.

Obviously, in the use of ethylene oxide and propylene oxide in combination one need not first use one oxide and then the other, but one can mix the two oxides and thus obtain what may be termed an indifferent oxyalkylation, i.e., no attempt to selectively add one and then the other, or any other variant.

Needless to say, one could start with ethylene oxide and then use propylene oxide, and then go back to ethylene oxide; or, inversely, start with propylene oxide, then use ethylene oxide, and then go back to propylene oxide; or, one could use a combination in which butylene oxide is used along with either one of the two oxides just mentioned, or a combination of both of them.

The same would be true in regard to a mixture of ethylene oxide and butylene oxide, or butylene oxide and propylene oxide.

The colors of the products usually vary from a reddish amber tint to a definitely red, amber and to a straw or light straw color. The reason is primarily that no effort is made to obtain colorless resins initially and the resins themselves may be yellow, amber, or even dark amber. Condensation of a nitrogenous product invariably yields a darker product than the original resin and usually has a reddish color. The solvent employed, if xylene, adds nothing to the color but one may use a darker colored aromatic petroleum solvent. Oxyalkylation generally tends to yield lighter colored products and the more oxide employed the lighter the color the product. Products can be prepared in which the final color is a lighter amber or straw color with a reddish tint. Such products can be decolorized by the use of clays, bleaching chars, etc. As far as use in demulsification is concerned, or some other industrial uses, there is no justification for the cost of bleaching the product.

Generally speaking, the amount of alkaline catalyst present is comparatively small and it need not be removed. Since the products per se are alkaline due to the presence of a basic nitrogen, the removal of the alkaline catalyst is somewhat more difficult than ordinarily is the case for the reason that if one adds hydrochloric acid, for example, to neutralize the alkalinity one may partially neutralize the basic nitrogen radical also. The preferred procedure is to ignore the present of the alkali unless it is objectionable or also add a stoichiometric amount of concentrated hydrochloric acid equal to the caustic soda present.

TABLE IX

| Ex. No. | OSC, Ex. No. | OSC, lbs. | Oxides | | | Catalyst, lbs. | Solvent, lbs. | OSC, lbs. | Oxides | | | Catalyst, lbs. | Solvent, lbs. | Molal ratio | | | Theo. mol. wt. |
|---|---|---|---|---|---|---|---|---|---|---|---|---|---|---|---|---|---|
| | | | EtO, lbs. | PrO, lbs. | BuO, lbs. | | | | EtO, lbs. | PrO, lbs. | BuO, lbs. | | | EtO to oxyalkyl. suscept. compd. | PrO to oxyalkyl. suscept. compd. | BuO to oxyalkyl. suscept. compd. | |
| 1E | 1D | 15.55 | | | | 1.0 | 15.60 | 15.55 | | | | 1.0 | 15.60 | | | | |
| 2E | 1D | 15.55 | 7.75 | | | 1.0 | 15.60 | 15.55 | 7.75 | | | 1.0 | 15.60 | 35.2 | | | 4,660 |
| 3E | 1D | 15.55 | 15.50 | | | 1.0 | 15.60 | 15.55 | 23.25 | | | 1.0 | 15.60 | 70.4 | | | 6,210 |
| 4E | 1D | 15.55 | 23.25 | | | 1.0 | 15.60 | 15.55 | 31.0 | | | 1.0 | 15.60 | 105.6 | | | 7,760 |
| 5E | 1D | 15.55 | 31.0 | | | 1.0 | 15.60 | 15.55 | 46.5 | | | 1.0 | 15.60 | 140.8 | | | 9,310 |
| 6E | 1D | 15.55 | 46.5 | | | 1.0 | 15.60 | 15.55 | 62.0 | | | 1.0 | 15.60 | 211.2 | | | 12,410 |
| 7E | 2D | 16.10 | | | | 1.0 | 16.10 | 16.10 | | | | 1.0 | 16.10 | 281.6 | | | 15,510 |
| 8E | 2D | 16.10 | 8.05 | | | 1.0 | 16.10 | 16.10 | 8.05 | | | 1.0 | 16.10 | 36.6 | | | 4,830 |
| 9E | 2D | 16.10 | 16.10 | | | 1.0 | 16.10 | 16.10 | 24.15 | | | 1.0 | 16.10 | 73.2 | | | 6,440 |
| 10E | 2D | 16.10 | 24.15 | | | 1.0 | 16.10 | 16.10 | 32.20 | | | 1.0 | 16.10 | 109.8 | | | 8,050 |
| 11E | 2D | 16.10 | 32.20 | | | 1.0 | 16.10 | 16.10 | 40.25 | | | 1.0 | 16.10 | 146.4 | | | 9,660 |
| 12E | 2D | 16.10 | 40.25 | | | 1.0 | 16.10 | 16.10 | 64.40 | | | 1.0 | 16.10 | 183.0 | | | 11,270 |
| 13E | 3D | 15.05 | | | | 1.0 | 14.95 | 15.05 | 15.05 | | | 1.0 | 14.95 | 282.8 | | | 16,100 |
| 14E | 3D | 15.05 | 15.05 | | | 1.0 | 14.95 | 15.05 | 30.10 | | | 1.0 | 14.95 | 68.4 | | | 6,020 |
| 15E | 3D | 15.05 | 30.10 | | | 1.0 | 14.95 | 15.05 | 45.15 | | | 1.0 | 14.95 | 136.8 | | | 9,030 |
| 16E | 3D | 15.05 | 45.15 | | | 1.0 | 14.95 | 15.05 | 60.20 | | | 1.0 | 14.95 | 205.2 | | | 12,040 |
| 17E | 3D | 15.05 | 60.20 | | | 1.0 | 14.95 | 15.05 | 75.25 | | | 1.0 | 14.95 | 273.6 | | | 15,050 |
| 18E | 3D | 15.05 | 75.25 | | | 1.0 | 14.95 | 15.05 | 90.30 | | | 1.0 | 14.95 | 342.0 | | | 18,060 |
| 19E | 1D | 15.55 | | | | 1.5 | 15.60 | 15.55 | | 15.5 | | 1.5 | 15.60 | 410.4 | | | 21,070 |
| 20E | 1D | 15.55 | | 15.5 | | 1.5 | 15.60 | 15.55 | | 31.0 | | 1.5 | 15.60 | | 53.4 | | 6,210 |
| 21E | 1D | 15.55 | | 31.0 | | 1.5 | 15.60 | 15.55 | | 46.5 | | 1.5 | 15.60 | | 106.8 | | 9,310 |
| 22E | 1D | 15.55 | | 46.5 | | 1.5 | 15.60 | 15.55 | | 62.0 | | 1.5 | 15.60 | | 160.2 | | 12,410 |
| 23E | 1D | 15.55 | | 62.0 | | 1.5 | 15.60 | 15.55 | | 77.5 | | 1.5 | 15.60 | | 213.6 | | 15,510 |
| 24E | 1D | 15.55 | | 77.5 | | 1.5 | 15.60 | 15.55 | | 93.0 | | 1.5 | 15.60 | | 267.0 | | 18,610 |
| 25E | 2D | 16.10 | | | | 1.5 | 16.10 | 16.10 | | 16.0 | | 1.5 | 16.10 | | 320.4 | | 21,710 |
| 26E | 2D | 16.10 | | 16.0 | | 1.5 | 16.10 | 16.10 | | 32.0 | | 1.5 | 16.10 | | 55.2 | | 6,420 |
| 27E | 2D | 16.10 | | 32.0 | | 1.5 | 16.10 | 16.10 | | 48.0 | | 1.5 | 16.10 | | 110.4 | | 9,620 |
| 28E | 2D | 16.10 | | 48.0 | | 1.5 | 16.10 | 16.10 | | 64.0 | | 1.5 | 16.10 | | 165.6 | | 12,820 |
| 29E | 2D | 16.10 | | 64.0 | | 1.5 | 16.10 | 16.10 | | 80.0 | | 1.5 | 16.10 | | 220.8 | | 16,020 |
| 30E | 2D | 16.10 | | 80.0 | | 1.5 | 16.10 | 16.10 | | 96.0 | | 1.5 | 16.10 | | 276.0 | | 19,220 |
| 31E | 3D | 15.05 | | | | 1.5 | 14.95 | 15.05 | | 15.0 | | 1.5 | 14.95 | | 331.2 | | 22,420 |
| 32E | 3D | 15.05 | | 15.0 | | 1.5 | 14.95 | 15.05 | | 30.0 | | 1.5 | 14.95 | | 51.7 | | 6,010 |
| 33E | 3D | 15.05 | | 30.0 | | 1.5 | 14.95 | 15.05 | | 60.0 | | 1.5 | 14.95 | | 103.4 | | 9,010 |
| 34E | 3D | 15.05 | | 60.0 | | 1.5 | 14.95 | 15.05 | | 75.0 | | 1.5 | 14.95 | | 206.8 | | 15,010 |
| 35E | 3D | 15.05 | | 75.0 | | 1.5 | 14.95 | 15.05 | | 90.0 | | 1.5 | 14.95 | | 258.5 | | 18,010 |
| 36E | 3D | 15.05 | | 90.0 | | 1.5 | 14.95 | 15.05 | | 105.0 | | 1.5 | 14.95 | | 310.2 | | 21,010 |
| 37E | 1D | 15.55 | | | | 1.5 | 15.60 | 15.05 | | | | 1.5 | 14.95 | | 361.9 | | 24,010 |
| 38E | 1D | 15.55 | | | 5.0 | 1.5 | 15.60 | 15.55 | | | 5.0 | 1.5 | 15.60 | | | 13.9 | 4,110 |
| 39E | 1D | 15.55 | | | 10.0 | 1.5 | 15.60 | 15.55 | | | 10.0 | 1.5 | 15.60 | | | 27.8 | 5,110 |
| 40E | 1D | 15.55 | | | 15.0 | 1.5 | 15.60 | 15.55 | | | 15.0 | 1.5 | 15.60 | | | 41.7 | 6,110 |
| 41E | 1D | 15.55 | | | 20.0 | 1.5 | 15.60 | 15.55 | | | 20.0 | 1.5 | 15.60 | | | 55.6 | 7,110 |
| 42E | 1D | 15.55 | | | 30.0 | 1.5 | 15.60 | 15.55 | | | 30.0 | 1.5 | 15.60 | | | 83.4 | 9,110 |
| 43E | 2D | 16.10 | | | | 1.5 | 16.10 | 16.10 | | | 60.0 | 1.5 | 15.60 | | | 166.8 | 12,110 |
| 44E | 2D | 16.10 | | | 8.0 | 1.5 | 16.10 | 16.10 | | | 8.0 | 1.5 | 16.10 | | | 22.2 | 4,820 |
| 45E | 2D | 16.10 | | | 16.0 | 1.5 | 16.10 | 16.10 | | | 16.0 | 1.5 | 16.10 | | | 44.4 | 6,420 |
| 46E | 2D | 16.10 | | | 24.0 | 1.5 | 16.10 | 16.10 | | | 24.0 | 1.5 | 16.10 | | | 66.6 | 8,020 |
| 47E | 2D | 16.10 | | | 32.0 | 1.5 | 16.10 | 16.10 | | | 32.0 | 1.5 | 16.10 | | | 88.8 | 9,620 |
| 48E | 2D | 16.10 | | | 48.0 | 1.5 | 16.10 | 16.10 | | | 48.0 | 1.5 | 16.10 | | | 133.2 | 12,820 |
| 49E | 3D | 15.05 | | | | 1.5 | 14.95 | 15.05 | | | 64.0 | 1.5 | 16.10 | | | 177.6 | 16,020 |
| 50E | 3D | 15.05 | | | 5.0 | 1.5 | 14.95 | 15.05 | | | 5.0 | 1.5 | 14.95 | | | 13.9 | 4,010 |
| 51E | 3D | 15.05 | | | 10.0 | 1.5 | 14.95 | 15.05 | | | 10.0 | 1.5 | 14.95 | | | 27.8 | 5,010 |
| 52E | 3D | 15.05 | | | 15.0 | 1.5 | 14.95 | 15.05 | | | 20.0 | 1.5 | 14.95 | | | 41.7 | 6,010 |
| 53E | 3D | 15.05 | | | 20.0 | 1.5 | 14.95 | 15.05 | | | 40.0 | 1.5 | 14.95 | | | 55.6 | 7,010 |
| 54E | 3D | 15.05 | | | 40.0 | 1.5 | 14.95 | 15.05 | | | 60.0 | 1.5 | 14.95 | | | 111.2 | 11,010 |
| | | | | | | | | | | | | | | | | 166.8 | 15,010 |

TABLE X

| Ex. No. | OSC, Ex. No. | OSC, lbs. | Oxides EtO, lbs. | Oxides PrO, lbs. | Oxides BuO, lbs. | Catalyst, lbs. | Solvent, lbs. | OSC, lbs. | Oxides EtO, lbs. | Oxides PrO, lbs. | Oxides BuO, lbs. | Catalyst, lbs. | Solvent, lbs. | Molal ratio EtO to oxyalkyl. suscept. compd. | Molal ratio PrO to oxyalkyl. suscept. compd. | Molal ratio BuO to oxyalkyl. suscept. compd. | Theo. mol. wt. |
|---|---|---|---|---|---|---|---|---|---|---|---|---|---|---|---|---|---|
| 1F | 3E | 15.55 | 23.25 | 5.0 | | 1.5 | 15.60 | 15.55 | 23.25 | 5.0 | | 1.5 | 15.60 | 105.6 | 17.25 | | 8,760 |
| 2F | 3E | 15.55 | 23.25 | 10.0 | | 1.5 | 15.60 | 15.55 | 23.25 | 10.0 | | 1.5 | 15.60 | 105.6 | 34.50 | | 9,760 |
| 3F | 3E | 15.55 | 23.25 | 15.0 | | 1.5 | 15.60 | 15.55 | 23.25 | 15.0 | | 1.5 | 15.60 | 105.6 | 51.75 | | 10,760 |
| 4F | 3E | 15.55 | 23.25 | 25.0 | | 1.5 | 15.60 | 15.55 | 23.25 | 25.0 | | 1.5 | 15.60 | 105.6 | 86.25 | | 12,760 |
| 5F | 3E | 15.55 | 23.25 | 40.0 | | 1.5 | 15.60 | 15.55 | 23.25 | 40.0 | | 1.5 | 15.60 | 105.6 | 138.0 | | 15,760 |
| 6F | 3E | 15.55 | 23.25 | 70.0 | | 1.5 | 15.60 | 15.55 | 23.25 | 70.0 | | 1.5 | 15.60 | 105.6 | 241.5 | | 21,760 |
| 7F | 10E | 16.10 | 32.20 | 4.0 | | 1.5 | 16.10 | 16.10 | 32.20 | 4.0 | | 1.5 | 16.10 | 146.4 | 13.8 | | 10,460 |
| 8F | 10E | 16.10 | 32.20 | 8.0 | | 1.5 | 16.10 | 16.10 | 32.20 | 8.0 | | 1.5 | 16.10 | 146.4 | 27.6 | | 11,260 |
| 9F | 10E | 16.10 | 32.20 | 16.0 | | 1.5 | 16.10 | 16.10 | 32.20 | 16.0 | | 1.5 | 16.10 | 146.4 | 55.2 | | 12,860 |
| 10F | 10E | 16.10 | 32.20 | 32.0 | | 1.5 | 16.10 | 16.10 | 32.20 | 32.0 | | 1.5 | 16.10 | 146.4 | 110.4 | | 16,060 |
| 11F | 10E | 16.10 | 32.20 | 48.0 | | 1.5 | 16.10 | 16.10 | 32.20 | 48.0 | | 1.5 | 16.10 | 146.4 | 165.6 | | 19,260 |
| 12F | 10E | 16.10 | 32.20 | 80.0 | | 1.5 | 16.10 | 16.10 | 32.20 | 80.0 | | 1.5 | 16.10 | 146.4 | 276.0 | | 25,660 |
| 13F | 15E | 15.05 | 45.15 | 15.0 | | 1.5 | 14.95 | 15.05 | 45.15 | 15.0 | | 1.4 | 14.95 | 205.2 | 51.7 | | 15,040 |
| 14F | 15E | 15.05 | 45.15 | 30.0 | | 1.5 | 14.95 | 15.05 | 45.15 | 30.0 | | 1.5 | 14.95 | 205.2 | 103.4 | | 18,040 |
| 15F | 15E | 15.05 | 45.15 | 45.0 | | 1.5 | 14.95 | 15.05 | 45.15 | 45.0 | | 1.5 | 14.95 | 205.2 | 155.1 | | 21,040 |
| 16F | 15E | 15.05 | 45.15 | 60.0 | | 1.5 | 14.95 | 15.05 | 45.15 | 60.0 | | 1.5 | 14.95 | 205.2 | 206.8 | | 24,040 |
| 17F | 15E | 15.05 | 45.15 | 75.0 | | 1.5 | 14.95 | 15.05 | 45.15 | 75.0 | | 1.5 | 14.95 | 205.2 | 258.5 | | 27,040 |
| 18F | 15E | 15.05 | 45.15 | 90.0 | | 1.5 | 14.95 | 15.05 | 45.15 | 90.0 | | 1.5 | 14.95 | 205.2 | 310.2 | | 30,040 |
| 19F | 24E | 15.55 | | 93.0 | | 1.5 | 15.60 | 15.55 | 5.0 | 93.0 | | 1.5 | 15.60 | 22.7 | 320.4 | | 22,710 |
| 20F | 24E | 15.55 | 5.0 | 93.0 | | 1.5 | 15.60 | 15.55 | 7.5 | 93.0 | | 1.5 | 15.60 | 34.05 | 320.4 | | 23,210 |
| 21F | 24E | 15.55 | 7.5 | 93.0 | | 1.5 | 15.60 | 15.55 | 10.0 | 93.0 | | 1.5 | 15.60 | 45.40 | 320.4 | | 23,710 |
| 22F | 24E | 15.55 | 10.0 | 93.0 | | 1.5 | 15.60 | 15.55 | 12.5 | 93.0 | | 1.5 | 15.60 | 56.75 | 320.4 | | 24,210 |
| 23F | 24E | 15.55 | 12.5 | 93.0 | | 1.5 | 15.60 | 15.55 | 15.0 | 93.0 | | 1.5 | 15.60 | 68.1 | 320.4 | | 24,710 |
| 24F | 24E | 15.55 | 15.0 | 93.0 | | 1.5 | 15.60 | 15.55 | 30.0 | 93.0 | | 1.5 | 15.60 | 136.2 | 320.4 | | 27,710 |
| 25F | 30E | 16.10 | | 96.0 | | 1.5 | 16.10 | 16.10 | 4.0 | 96.0 | | 1.5 | 16.10 | 18.17 | 331.2 | | 23,220 |
| 26F | 30E | 16.10 | 4.0 | 96.0 | | 1.5 | 16.10 | 16.10 | 8.0 | 96.0 | | 1.5 | 16.10 | 36.3 | 331.2 | | 24,020 |
| 27F | 30E | 16.10 | 8.0 | 96.0 | | 1.5 | 16.10 | 16.10 | 12.0 | 96.0 | | 1.5 | 16.10 | 54.5 | 331.2 | | 24,820 |
| 28F | 30E | 16.10 | 12.0 | 96.0 | | 1.5 | 16.10 | 16.10 | 16.0 | 96.0 | | 1.5 | 16.10 | 72.6 | 331.2 | | 25,620 |
| 29F | 30E | 16.10 | 16.0 | 96.0 | | 1.5 | 16.10 | 16.10 | 20.0 | 96.0 | | 1.5 | 16.10 | 90.8 | 331.2 | | 26,420 |
| 30F | 30E | 16.10 | 20.0 | 96.0 | | 1.5 | 16.10 | 16.10 | 24.0 | 96.0 | | 1.5 | 16.10 | 109.0 | 331.2 | | 27,220 |
| 31F | 36E | 15.05 | | 105.0 | | 1.5 | 14.95 | 15.05 | 7.5 | 105.0 | | 1.5 | 14.95 | 34.1 | 361.9 | | 25,510 |
| 32F | 36E | 15.05 | 7.5 | 105.0 | | 1.5 | 14.95 | 15.05 | 15.0 | 105.0 | | 1.5 | 14.95 | 68.2 | 361.9 | | 27,010 |
| 33F | 36E | 15.05 | 15.0 | 105.0 | | 1.5 | 14.95 | 15.05 | 18.75 | 105.0 | | 1.5 | 14.95 | 85.25 | 361.9 | | 27,760 |
| 34F | 36E | 15.05 | 18.75 | 105.0 | | 1.5 | 14.95 | 15.05 | 22.50 | 105.0 | | 1.5 | 14.95 | 102.3 | 361.9 | | 28,510 |
| 35F | 36E | 15.05 | 22.50 | 105.0 | | 1.5 | 14.95 | 15.05 | 30.0 | 105.0 | | 1.5 | 14.95 | 136.4 | 361.9 | | 30,010 |
| 36F | 36E | 15.05 | 30.0 | 105.0 | | 1.5 | 14.95 | 15.05 | 37.5 | 105.0 | | 1.5 | 14.95 | 153.45 | 361.9 | | 31,510 |
| 37F | 4E | 15.55 | 31.0 | | 15.5 | 1.0 | 15.60 | 15.55 | 31.0 | | 15.5 | 1.0 | 15.60 | 140.8 | | 43.0 | 12,410 |
| 38F | 4E | 15.55 | 31.0 | | 31.0 | 1.0 | 15.60 | 15.55 | 31.0 | | 31.0 | 1.0 | 15.60 | 140.8 | | 86.0 | 15,510 |
| 39F | 4E | 15.55 | 31.0 | | 34.1 | 1.0 | 15.60 | 15.55 | 31.0 | | 34.1 | 1.0 | 15.60 | 140.8 | | 94.6 | 16,130 |
| 40F | 4E | 15.55 | 31.0 | | 37.2 | 1.0 | 15.60 | 15.55 | 31.0 | | 37.2 | 1.0 | 15.60 | 140.8 | | 103.2 | 16,750 |
| 41F | 4E | 15.55 | 31.0 | | 40.3 | 1.0 | 15.60 | 15.55 | 31.0 | | 40.3 | 1.0 | 15.60 | 140.8 | | 111.8 | 17,370 |
| 42F | 4E | 15.55 | 31.0 | | 43.4 | 1.0 | 15.60 | 15.55 | 31.0 | | 43.4 | 1.0 | 15.60 | 140.8 | | 120.4 | 17,990 |
| 43F | 11E | 16.10 | 40.25 | | 16.0 | 1.0 | 16.10 | 16.10 | 40.25 | | 16.0 | 1.0 | 16.10 | 183.0 | | 44.4 | 14,470 |
| 44F | 11E | 16.10 | 40.25 | | 32.0 | 1.0 | 16.10 | 16.10 | 40.25 | | 32.0 | 1.0 | 16.10 | 183.0 | | 88.8 | 17,670 |
| 45F | 11E | 16.10 | 40.25 | | 40.0 | 1.0 | 16.10 | 16.10 | 40.25 | | 40.0 | 1.0 | 16.10 | 183.0 | | 111.0 | 19,270 |
| 46F | 11E | 16.10 | 40.25 | | 42.0 | 1.0 | 16.10 | 16.10 | 40.25 | | 42.0 | 1.0 | 16.10 | 183.0 | | 116.55 | 19,670 |
| 47F | 11E | 16.10 | 40.25 | | 44.0 | 1.0 | 16.10 | 16.10 | 40.25 | | 44.0 | 1.0 | 16.10 | 183.0 | | 122.10 | 20,070 |
| 48F | 11E | 16.10 | 40.25 | | 48.0 | 1.0 | 16.10 | 16.10 | 40.25 | | 48.0 | 1.0 | 16.10 | 183.0 | | 133.2 | 20,470 |
| 49F | 16E | 15.05 | 60.20 | | | 1.0 | 14.95 | 15.05 | 60.2 | | 15.0 | 1.0 | 14.95 | 273.6 | | 41.7 | 18,050 |
| 50F | 16E | 15.05 | 60.20 | | 15.0 | 1.0 | 14.95 | 15.05 | 60.2 | | 30.0 | 1.0 | 14.95 | 273.6 | | 83.4 | 21,050 |
| 51F | 16E | 15.05 | 60.20 | | 30.0 | 1.0 | 14.95 | 15.05 | 60.2 | | 45.0 | 1.0 | 14.95 | 273.6 | | 124.1 | 24,050 |
| 52F | 16E | 15.05 | 60.20 | | 45.0 | 1.0 | 14.95 | 15.05 | 60.2 | | 60.0 | 1.0 | 14.95 | 273.6 | | 166.8 | 27,050 |
| 53F | 16E | 15.05 | 60.20 | | 60.0 | 1.0 | 14.95 | 15.05 | 60.2 | | 65.0 | 1.0 | 14.95 | 273.6 | | 180.7 | 28,050 |
| 54F | 16E | 15.05 | 60.20 | | 65.0 | 1.0 | 14.95 | 15.05 | 60.2 | | 70.0 | 1.0 | 14.95 | 273.6 | | 194.6 | 29,050 |
| 55F | 42E | 15.55 | | | 60.0 | 1.0 | 15.60 | 15.55 | 3.1 | | 60.0 | 1.0 | 15.60 | 14.08 | | 166.8 | 12,928 |
| 56F | 42E | 15.55 | 3.1 | | 60.0 | 1.0 | 15.60 | 15.55 | 6.2 | | 60.0 | 1.0 | 15.60 | 28.16 | | 166.8 | 13,546 |
| 57F | 42E | 15.55 | 6.2 | | 60.0 | 1.0 | 15.60 | 15.55 | 9.3 | | 60.0 | 1.0 | 15.60 | 42.24 | | 166.8 | 14,164 |
| 58F | 42E | 15.55 | 9.3 | | 60.0 | 1.0 | 15.60 | 15.55 | 15.5 | | 60.0 | 1.0 | 15.60 | 70.4 | | 166.8 | 15,400 |
| 59F | 42E | 15.55 | 15.5 | | 60.0 | 1.0 | 15.60 | 15.55 | 31.0 | | 60.0 | 1.0 | 15.60 | 140.8 | | 166.8 | 18,490 |
| 60F | 42E | 15.55 | 31.0 | | 60.0 | 1.0 | 15.60 | 15.55 | 62.0 | | 60.0 | 1.0 | 15.60 | 281.6 | | 166.8 | 24,670 |
| 61F | 47E | 16.10 | | | 48.0 | 1.0 | 16.10 | 16.10 | 4.0 | | 48.0 | 1.0 | 16.10 | 18.2 | | 133.2 | 13,620 |
| 62F | 47E | 16.10 | 4.0 | | 48.0 | 1.0 | 16.10 | 16.10 | 8.0 | | 48.0 | 1.0 | 16.10 | 36.4 | | 133.2 | 14,420 |
| 63F | 47E | 16.10 | 8.0 | | 48.0 | 1.0 | 16.10 | 16.10 | 12.0 | | 48.0 | 1.0 | 16.10 | 54.6 | | 133.2 | 15,220 |
| 64F | 47E | 16.10 | 12.0 | | 48.0 | 1.0 | 16.10 | 16.10 | 16.0 | | 48.0 | 1.0 | 16.10 | 72.8 | | 133.2 | 16,020 |
| 65F | 47E | 16.10 | 16.0 | | 48.0 | 1.0 | 16.10 | 16.10 | 24.0 | | 48.0 | 1.0 | 16.10 | 109.2 | | 133.2 | 17,620 |
| 66F | 47E | 16.10 | 24.0 | | 48.0 | 1.0 | 16.10 | 16.10 | 48.0 | | 48.0 | 1.0 | 16.10 | 218.4 | | 133.2 | 22,420 |
| 67F | 54E | 15.05 | | | 60.0 | 1.0 | 14.95 | 15.05 | 3.0 | | 60.0 | 1.0 | 14.95 | 13.62 | | 166.8 | 15,610 |
| 68F | 54E | 15.05 | 3.0 | | 60.0 | 1.0 | 14.95 | 15.05 | 6.0 | | 60.0 | 1.0 | 14.95 | 27.25 | | 166.8 | 16,210 |
| 69F | 54E | 15.05 | 6.0 | | 60.0 | 1.0 | 14.95 | 15.05 | 12.0 | | 60.0 | 1.0 | 14.95 | 54.5 | | 166.8 | 17,410 |
| 70F | 54E | 15.05 | 12.0 | | 60.0 | 1.0 | 14.95 | 15.05 | 24.0 | | 60.0 | 1.0 | 14.95 | 109.0 | | 166.8 | 19,810 |
| 71F | 54E | 15.05 | 24.0 | | 60.0 | 1.0 | 14.95 | 15.05 | 36.0 | | 60.0 | 1.0 | 14.95 | 163.5 | | 166.8 | 22,210 |
| 72F | 54E | 15.05 | 36.0 | | 60.0 | 1.0 | 14.95 | 15.05 | 60.0 | | 60.0 | 1.0 | 14.95 | 272.5 | | 166.8 | 27,010 |
| 73F | 41E | 15.55 | | | 30.0 | 1.5 | 15.60 | 15.55 | | 7.5 | 30.0 | 1.5 | 15.60 | | 25.82 | 83.4 | 10,610 |
| 74F | 41E | 15.55 | | 7.5 | 30.0 | 1.5 | 15.60 | 15.55 | | 15.0 | 30.0 | 1.5 | 15.60 | | 51.64 | 83.4 | 12,110 |
| 75F | 41E | 15.55 | | 15.0 | 30.0 | 1.5 | 15.60 | 15.55 | | 22.5 | 30.0 | 1.5 | 15.60 | | 77.46 | 83.4 | 13,610 |
| 76F | 41E | 15.55 | | 22.5 | 30.0 | 1.5 | 15.60 | 15.55 | | 30.0 | 30.0 | 1.5 | 15.60 | | 103.28 | 83.4 | 15,110 |
| 77F | 41E | 15.55 | | 30.0 | 30.0 | 1.5 | 15.60 | 15.55 | | 45.0 | 30.0 | 1.5 | 15.60 | | 154.92 | 83.4 | 18,110 |
| 78F | 41E | 15.55 | | 45.0 | 30.0 | 1.5 | 15.60 | 15.55 | | 60.0 | 30.0 | 1.5 | 15.60 | | 206.56 | 83.4 | 21,110 |
| 79F | 46E | 16.10 | | | 32.0 | 1.5 | 16.10 | 16.10 | | 8.0 | 32.0 | 1.5 | 16.10 | | 27.6 | 88.8 | 11,220 |
| 80F | 46E | 16.10 | | 8.0 | 32.0 | 1.5 | 16.10 | 16.10 | | 16.0 | 32.0 | 1.5 | 16.10 | | 55.2 | 88.8 | 12,820 |
| 81F | 46E | 16.10 | | 16.0 | 32.0 | 1.5 | 16.10 | 16.10 | | 24.0 | 32.0 | 1.5 | 16.10 | | 82.8 | 88.8 | 14,420 |
| 82F | 46E | 16.10 | | 24.0 | 32.0 | 1.5 | 16.10 | 16.10 | | 32.0 | 32.0 | 1.5 | 16.10 | | 110.4 | 88.8 | 16,020 |
| 83F | 46E | 16.10 | | 32.0 | 32.0 | 1.5 | 16.10 | 16.10 | | 48.0 | 32.0 | 1.5 | 16.10 | | 165.6 | 88.8 | 19,220 |
| 84F | 46E | 16.10 | | 48.0 | 32.0 | 1.5 | 16.10 | 16.10 | | 56.0 | 32.0 | 1.5 | 16.10 | | 193.2 | 88.8 | 20,820 |
| 85F | 53E | 15.05 | | | 40.0 | 1.5 | 14.95 | 15.05 | | 10.0 | 40.0 | 1.5 | 14.95 | | 34.5 | 111.2 | 13,010 |
| 86F | 53E | 15.05 | | 10.0 | 40.0 | 1.5 | 14.95 | 15.05 | | 15.0 | 40.0 | 1.5 | 14.95 | | 51.75 | 111.2 | 14,010 |
| 87F | 53E | 15.05 | | 15.0 | 40.0 | 1.5 | 14.95 | 15.05 | | 20.0 | 40.0 | 1.5 | 14.95 | | 69.0 | 111.2 | 15,010 |
| 88F | 53E | 15.05 | | 20.0 | 40.0 | 1.5 | 14.95 | 15.05 | | 35.0 | 40.0 | 1.5 | 14.95 | | 120.75 | 111.2 | 18,010 |
| 89F | 53E | 15.05 | | 35.0 | 40.0 | 1.5 | 14.95 | 15.05 | | 50.0 | 40.0 | 1.5 | 14.95 | | 172.5 | 111.2 | 21,010 |
| 90F | 53E | 15.05 | | 50.0 | 40.0 | 1.5 | 14.95 | 15.05 | | 65.0 | 40.0 | 1.5 | 14.95 | | 224.25 | 111.2 | 24,010 |

TABLE XI

| Ex. No. | OSC, Ex. No. | OSC, lbs. | Composition before | | | | | Composition at end | | | | | | Molal ratio | | | Theo. mol. wt. |
|---|---|---|---|---|---|---|---|---|---|---|---|---|---|---|---|---|---|
| | | | Oxides | | | Catalyst, lbs. | Solvent, lbs. | OSC, lbs. | Oxides | | | Catalyst, lbs. | Solvent, lbs. | EtO to oxyalkyl. suscept. compd. | PrO to oxyalkyl. suscept. compd. | BuO to oxyalkyl. suscept. compd. | |
| | | | EtO, lbs. | PrO, lbs. | BuO, lbs. | | | | EtO, lbs. | PrO, lbs. | BuO, lbs. | | | | | | |
| 1G | 78F | 15.55 | | 60.0 | 30.0 | 1.5 | 15.60 | 15.55 | 5.25 | 60.0 | 30.0 | 1.5 | 15.60 | 23.9 | 206.56 | 83.4 | 22,160 |
| 2G | 78F | 15.55 | 5.25 | 60.0 | 30.0 | 1.5 | 15.60 | 15.55 | 10.50 | 60.0 | 30.0 | 1.5 | 15.60 | 47.8 | 206.56 | 83.4 | 23,210 |
| 3G | 78F | 15.55 | 10.5 | 60.0 | 30.0 | 1.5 | 15.60 | 15.55 | 15.75 | 60.0 | 30.0 | 1.5 | 15.60 | 71.7 | 206.56 | 83.4 | 24,260 |
| 4G | 78F | 15.55 | 15.75 | 60.0 | 30.0 | 1.5 | 15.60 | 15.55 | 21.00 | 60.0 | 30.0 | 1.5 | 15.60 | 95.6 | 206.56 | 83.4 | 25,310 |
| 5G | 78F | 15.55 | 21.0 | 60.0 | 30.0 | 1.5 | 15.60 | 15.55 | 26.25 | 60.0 | 30.0 | 1.5 | 15.60 | 119.5 | 206.56 | 83.4 | 26,360 |
| 6G | 78F | 15.55 | 26.25 | 60.0 | 30.0 | 1.5 | 15.60 | 15.55 | 31.50 | 60.0 | 30.0 | 1.5 | 15.60 | 143.4 | 206.56 | 83.4 | 27,410 |
| 7G | 83F | 16.10 | | 48.0 | 32.0 | 1.5 | 16.10 | 16.10 | 4.0 | 48.0 | 32.0 | 1.5 | 16.10 | 18.18 | 165.6 | 88.8 | 20,020 |
| 8G | 83F | 16.10 | 4.0 | 48.0 | 32.0 | 1.5 | 16.10 | 16.10 | 8.0 | 48.0 | 32.0 | 1.5 | 16.10 | 36.36 | 165.6 | 88.8 | 20,820 |
| 9G | 83F | 16.10 | 8.0 | 48.0 | 32.0 | 1.5 | 16.10 | 16.10 | 12.0 | 48.0 | 32.0 | 1.5 | 16.10 | 54.54 | 165.6 | 88.8 | 21,620 |
| 10G | 83F | 16.10 | 12.0 | 48.0 | 32.0 | 1.5 | 16.10 | 16.10 | 16.0 | 48.0 | 32.0 | 1.5 | 16.10 | 72.72 | 165.6 | 88.8 | 22,420 |
| 11G | 83F | 16.10 | 16.0 | 48.0 | 32.0 | 1.5 | 16.10 | 16.10 | 24.0 | 48.0 | 32.0 | 1.5 | 16.10 | 109.08 | 165.6 | 88.8 | 24,020 |
| 12G | 83F | 16.10 | 24.0 | 48.0 | 32.0 | 1.5 | 16.10 | 16.10 | 48.0 | 48.0 | 32.0 | 1.5 | 16.10 | 218.16 | 165.6 | 88.8 | 28,820 |
| 13G | 87F | 15.05 | | 20.0 | 40.0 | 1.5 | 14.95 | 15.05 | 5.0 | 20.0 | 40.0 | 1.5 | 14.95 | 22.73 | 69.0 | 111.2 | 16,010 |
| 14G | 87F | 15.05 | 5.0 | 20.0 | 40.0 | 1.5 | 14.95 | 15.05 | 10.0 | 20.0 | 40.0 | 1.5 | 14.95 | 45.46 | 69.0 | 111.2 | 17,010 |
| 15G | 87F | 15.05 | 10.0 | 20.0 | 40.0 | 1.5 | 14.95 | 15.05 | 12.5 | 20.0 | 40.0 | 1.5 | 14.95 | 56.83 | 69.0 | 111.2 | 17,510 |
| 16G | 87F | 15.05 | 12.5 | 20.0 | 40.0 | 1.5 | 14.95 | 15.05 | 15.0 | 20.0 | 40.0 | 1.5 | 14.95 | 68.2 | 69.0 | 111.2 | 18,010 |
| 17G | 87F | 15.05 | 15.0 | 20.0 | 40.0 | 1.5 | 14.95 | 15.05 | 17.5 | 20.0 | 40.0 | 1.5 | 14.95 | 79.56 | 69.0 | 111.2 | 18,510 |
| 18G | 87F | 15.05 | 17.5 | 20.0 | 40.0 | 1.5 | 14.95 | 15.05 | 20.0 | 20.0 | 40.0 | 1.5 | 14.95 | 90.92 | 69.0 | 111.2 | 19,010 |
| 19G | 58F | 15.55 | 15.5 | | 60.0 | 1.5 | 15.60 | 15.55 | 15.5 | 6.2 | 60.0 | 1.5 | 15.60 | 70.4 | 21.36 | 166.8 | 16,640 |
| 20G | 58F | 15.55 | 15.5 | 6.2 | 60.0 | 1.5 | 15.60 | 15.55 | 15.5 | 12.4 | 60.0 | 1.5 | 15.60 | 70.4 | 42.72 | 166.8 | 17,880 |
| 21G | 58F | 15.55 | 15.5 | 12.4 | 60.0 | 1.5 | 15.60 | 15.55 | 15.5 | 15.5 | 60.0 | 1.5 | 15.60 | 70.4 | 53.4 | 166.8 | 18,500 |
| 22G | 58F | 15.55 | 15.5 | 15.5 | 60.0 | 1.5 | 15.60 | 15.55 | 15.5 | 24.8 | 60.0 | 1.5 | 15.60 | 70.4 | 85.44 | 166.8 | 19,740 |
| 23G | 58F | 15.55 | 15.5 | 24.8 | 60.0 | 1.5 | 15.60 | 15.55 | 15.5 | 31.0 | 60.0 | 1.5 | 15.60 | 70.4 | 106.8 | 166.8 | 20,980 |
| 24G | 58F | 15.55 | 15.5 | 31.0 | 60.0 | 1.5 | 15.60 | 15.55 | 15.5 | 46.5 | 60.0 | 1.5 | 15.60 | 70.4 | 160.2 | 166.8 | 24,080 |
| 25G | 65F | 16.10 | 24.0 | | 48.0 | 1.5 | 16.10 | 16.10 | 24.0 | 8.05 | 48.0 | 1.5 | 16.10 | 109.2 | 27.8 | 133.2 | 19,230 |
| 26G | 65F | 16.10 | 24.0 | 8.05 | 48.0 | 1.5 | 16.10 | 16.10 | 24.0 | 16.10 | 48.0 | 1.5 | 16.10 | 109.2 | 55.6 | 133.2 | 20,840 |
| 27G | 65F | 16.10 | 24.0 | 16.10 | 48.0 | 1.5 | 16.10 | 16.10 | 24.0 | 24.15 | 48.0 | 1.5 | 16.10 | 109.2 | 83.4 | 133.2 | 22,450 |
| 28G | 65F | 16.10 | 24.0 | 24.15 | 48.0 | 1.5 | 16.10 | 16.10 | 24.0 | 32.20 | 48.0 | 1.5 | 16.10 | 109.2 | 111.2 | 133.2 | 24,060 |
| 29G | 65F | 16.10 | 24.0 | 32.20 | 48.0 | 1.5 | 16.10 | 16.10 | 24.0 | 40.25 | 48.0 | 1.5 | 16.10 | 109.2 | 139.2 | 133.2 | 25,670 |
| 30G | 65F | 16.10 | 24.0 | 40.25 | 48.0 | 1.5 | 16.10 | 16.10 | 24.0 | 48.30 | 48.0 | 1.5 | 16.10 | 109.2 | 166.8 | 133.2 | 27,280 |
| 31G | 71F | 15.05 | 36.0 | | 60.0 | 1.5 | 14.95 | 15.05 | 36.0 | 3.0 | 60.0 | 1.5 | 14.95 | 163.5 | 10.35 | 166.8 | 22,810 |
| 32G | 71F | 15.05 | 36.0 | 3.0 | 60.0 | 1.5 | 14.95 | 15.05 | 36.0 | 6.0 | 60.0 | 1.5 | 14.95 | 163.5 | 20.70 | 166.8 | 23,410 |
| 33G | 71F | 15.05 | 36.0 | 6.0 | 60.0 | 1.5 | 14.95 | 15.05 | 36.9 | 9.0 | 60.0 | 1.5 | 14.95 | 163.5 | 31.05 | 166.8 | 24,010 |
| 34G | 71F | 15.05 | 36.0 | 9.0 | 60.0 | 1.5 | 14.95 | 15.05 | 36.0 | 12.0 | 60.0 | 1.5 | 14.95 | 163.5 | 41.4 | 166.8 | 24,610 |
| 35G | 71F | 15.05 | 36.0 | 12.0 | 60.0 | 1.5 | 14.95 | 15.05 | 36.0 | 18.0 | 60.0 | 1.5 | 14.95 | 163.5 | 62.10 | 166.8 | 25,810 |
| 36G | 71F | 15.05 | 36.0 | 18.0 | 60.0 | 1.5 | 14.95 | 15.05 | 36.0 | 36.0 | 60.0 | 1.5 | 14.95 | 163.5 | 124.2 | 166.8 | 29,410 |

TABLE XII

| Ex. No. | Max. temp., °C. | Max. pres., p.s.i. | Time, hrs. | Solubility | | |
|---|---|---|---|---|---|---|
| | | | | Water | Xylene | Kerosene |
| 1E | 125–130 | 10–15 | ½ | Insoluble | Soluble | Insoluble. |
| 2E | 125–130 | 10–15 | ½ | Emulsifiable | do | Do. |
| 3E | 125–130 | 10–15 | ¾ | do | do | Do. |
| 4E | 125–130 | 10–15 | 1 | do | do | Do. |
| 5E | 125–130 | 10–15 | 2 | Soluble | Insoluble | Do. |
| 6E | 125–130 | 10–15 | 2½ | do | do | Do. |
| 7E | 125–130 | 10–15 | ½ | Insoluble | Soluble | Do. |
| 8E | 125–130 | 10–15 | ½ | Emulsifiable | do | Do. |
| 9E | 125–130 | 10–15 | 1 | do | do | Do. |
| 10E | 125–130 | 10–15 | 1 | do | do | Do. |
| 11E | 125–130 | 10–15 | 1½ | Soluble | do | Do. |
| 12E | 125–130 | 10–15 | 2¾ | do | Insoluble | Do. |
| 13E | 125–130 | 10–15 | 1 | Emulsifiable | Soluble | Do. |
| 14E | 125–130 | 10–15 | 1 | do | do | Do. |
| 15E | 125–130 | 10–15 | 1¼ | Soluble | do | Do. |
| 16E | 125–130 | 10–15 | 1¾ | do | Insoluble | Do. |
| 17E | 125–130 | 10–15 | 2 | do | do | Do. |
| 18E | 125–130 | 10–15 | 2½ | do | do | Do. |
| 19E | 125–130 | 10–15 | 1 | Insoluble | Soluble | Do. |
| 20E | 125–130 | 10–15 | 1 | do | do | Do. |
| 21E | 125–130 | 10–15 | 2 | do | do | Do. |
| 22E | 125–130 | 10–15 | 2½ | do | do | Do. |
| 23E | 125–130 | 10–15 | 3 | do | do | Soluble. |
| 24E | 125–130 | 10–15 | 3¾ | do | do | Do. |
| 25E | 125–130 | 10–15 | 1 | do | do | Insoluble. |
| 26E | 125–130 | 10–15 | 1¼ | do | do | Do. |
| 27E | 125–130 | 10–15 | 2 | do | do | Do. |
| 28E | 125–130 | 10–15 | 2 | do | do | Do. |
| 29E | 125–130 | 10–15 | 2¾ | do | do | Soluble. |
| 30E | 125–130 | 10–15 | 4 | do | do | Do. |
| 31E | 125–130 | 10–15 | 1 | do | do | Insoluble. |
| 32E | 125–130 | 10–15 | 1 | do | do | Do. |
| 33E | 125–130 | 10–15 | 2½ | do | do | Do. |
| 34E | 125–130 | 10–15 | 2½ | do | do | Do. |
| 35E | 125–130 | 10–15 | 3¼ | do | do | Soluble. |
| 36E | 125–130 | 10–15 | 5 | do | do | Do. |
| 37E | 140–150 | 10–15 | 1 | do | do | Insoluble. |
| 38E | 140–150 | 10–15 | 1 | do | do | Do. |
| 39E | 140–150 | 10–15 | 1½ | do | do | Do. |
| 40E | 140–150 | 10–15 | 2½ | do | do | Do. |
| 41E | 140–150 | 10–15 | 2½ | do | do | Do. |
| 42E | 140–150 | 10–15 | 6 | do | do | Soluble. |
| 43E | 140–150 | 10–15 | 1¾ | do | do | Insoluble. |
| 44E | 140–150 | 10–15 | 2 | do | do | Do. |
| 45E | 140–150 | 10–15 | 2 | do | do | Do. |
| 46E | 140–150 | 10–15 | 2½ | do | do | Do. |
| 47E | 140–150 | 10–15 | 4 | do | do | Do. |
| 48E | 140–150 | 10–15 | 6½ | do | do | Soluble. |
| 49E | 140–150 | 10–15 | 1½ | do | do | Insoluble. |
| 50E | 140–150 | 10–15 | 1½ | do | do | Do. |
| 51E | 140–150 | 10–15 | 1¾ | do | do | Do. |
| 52E | 140–150 | 10–15 | 2 | do | do | Do. |
| 53E | 140–150 | 10–15 | 4 | do | do | Do. |
| 54E | 140–150 | 10–15 | 6¼ | do | do | Soluble. |

TABLE XIII

| Ex. No. | Max. temp., °C. | Max. pres., p. s. i. | Time, hrs. | Solubility Water | Solubility Xylene | Solubility Kerosene |
|---|---|---|---|---|---|---|
| 1F | 125-130 | 10-15 | 1¾ | Emulsifiable | Soluble | Insoluble. |
| 2F | 125-130 | 10-15 | ¾ | do | do | Do. |
| 3F | 125-130 | 10-15 | 1 | do | do | Do. |
| 4F | 125-130 | 10-15 | 2 | do | do | Do. |
| 5F | 125-130 | 10-15 | 2¾ | Insoluble | do | Do. |
| 6F | 125-130 | 10-15 | 4½ | do | do | Do. |
| 7F | 125-130 | 10-15 | 3½ | Emulsifiable | do | Do. |
| 8F | 125-130 | 10-15 | ¾ | do | do | Do. |
| 9F | 125-130 | 10-15 | 1¾ | do | do | Do. |
| 10F | 125-130 | 10-15 | 2½ | do | do | Do. |
| 11F | 125-130 | 10-15 | 3½ | do | do | Do. |
| 12F | 125-130 | 10-15 | 5¾ | Insoluble | do | Do. |
| 13F | 125-130 | 10-15 | 4½ | Emulsifiable | do | Do. |
| 14F | 125-130 | 10-15 | 1½ | do | do | Do. |
| 15F | 125-130 | 10-15 | 2 | do | do | Do. |
| 16F | 125-130 | 10-15 | 2½ | do | do | Do. |
| 17F | 125-130 | 10-15 | 3½ | Insoluble | do | Do. |
| 18F | 125-130 | 10-15 | 5 | do | do | Do. |
| 19F | 125-130 | 10-15 | 13½ | do | do | Soluble. |
| 20F | 125-130 | 10-15 | ¾ | do | do | Do. |
| 21F | 125-130 | 10-15 | ¾ | do | do | Insoluble. |
| 22F | 125-130 | 10-15 | ¾ | do | do | Do. |
| 23F | 125-130 | 10-15 | 1 | do | do | Do. |
| 24F | 125-130 | 10-15 | 2 | Emulsifiable | do | Do. |
| 25F | 125-130 | 10-15 | 12½ | Insoluble | do | Soluble. |
| 26F | 125-130 | 10-15 | 1 | do | do | Do. |
| 27F | 125-130 | 10-15 | 1 | do | do | Insoluble. |
| 28F | 125-130 | 10-15 | 1¼ | do | do | Do. |
| 29F | 125-130 | 10-15 | 1½ | do | do | Do. |
| 30F | 125-130 | 10-15 | 2¾ | Emulsifiable | do | Do. |
| 31F | 125-130 | 10-15 | 16 | Insoluble | do | Soluble. |
| 32F | 125-130 | 10-15 | 1¼ | do | do | Do. |
| 33F | 125-130 | 10-15 | 2 | do | do | Insoluble. |
| 34F | 125-130 | 10-15 | 2 | do | do | Do. |
| 35F | 125-130 | 10-15 | 3 | do | do | Do. |
| 36F | 125-130 | 10-15 | 3¾ | Emulsifiable | do | Do. |
| 37F | 125-150 | 10-15 | 4½ | do | do | Do. |
| 38F | 145-150 | 10-15 | 3 | do | do | Do. |
| 39F | 145-150 | 10-15 | 1 | do | do | Do. |
| 40F | 145-150 | 10-15 | 1½ | do | do | Do. |
| 41F | 145-150 | 10-15 | 2 | do | do | Do. |
| 42F | 145-150 | 10-15 | 3 | Insoluble | do | Do. |
| 43F | 125-150 | 10-15 | 6¼ | Emulsifiable | do | Do. |
| 44F | 145-150 | 10-15 | 2½ | do | do | Do. |
| 45F | 145-150 | 10-15 | 1¾ | do | do | Do. |
| 46F | 145-150 | 10-15 | 1 | do | do | Do. |
| 47F | 145-150 | 10-15 | 1½ | do | do | Do. |
| 48F | 145-150 | 10-15 | 2 | do | do | Do. |
| 49F | 125-150 | 10-15 | 7½ | do | do | Do. |
| 50F | 145-150 | 10-15 | 3 | do | do | Do. |
| 51F | 145-150 | 10-15 | 3 | do | do | Do. |
| 52F | 145-150 | 10-15 | 3½ | do | do | Do. |
| 53F | 145-150 | 10-15 | 2¼ | do | do | Do. |
| 54F | 145-150 | 10-15 | 2½ | do | do | Soluble. |
| 55F | 145-125 | 10-15 | 15 | Insoluble | do | Insoluble. |
| 56F | 125-130 | 10-15 | ¾ | do | do | Do. |
| 57F | 125-130 | 10-15 | ¾ | do | do | Do. |
| 58F | 125-130 | 10-15 | 1 | do | do | Do. |
| 59F | 125-130 | 10-15 | 2½ | Emulsifiable | do | Do. |
| 60F | 125-130 | 10-15 | 4 | do | do | Do. |
| 61F | 145-125 | 10-15 | 13 | Insoluble | do | Do. |
| 62F | 125-130 | 10-15 | ¾ | do | do | Do. |
| 63F | 125-130 | 10-15 | 1 | do | do | Do. |
| 64F | 125-130 | 10-15 | 1 | Emulsifiable | do | Do. |
| 65F | 125-130 | 10-15 | 2 | do | do | Do. |
| 66F | 125-130 | 10-15 | 5 | do | do | Soluble. |
| 67F | 145-125 | 10-15 | 17½ | Insoluble | do | Insoluble. |
| 68F | 125-130 | 10-15 | ½ | do | do | Do. |
| 69F | 125-130 | 10-15 | ¾ | do | do | Do. |
| 70F | 125-130 | 10-15 | 1½ | Emulsifiable | do | Do. |
| 71F | 125-130 | 10-15 | 2¼ | do | do | Do. |
| 72F | 125-130 | 10-15 | 4¼ | do | do | Do |
| 73F | 145-125 | 10-15 | 10½ | Insoluble | do | Do. |
| 74F | 125-130 | 10-15 | 2½ | do | do | Do. |
| 75F | 125-130 | 10-15 | 2½ | do | do | Do. |
| 76F | 125-130 | 10-15 | 2¾ | do | do | Soluble. |
| 77F | 125-130 | 10-15 | 4 | do | do | Do. |
| 78F | 125-130 | 10-15 | 4½ | do | do | Insoluble. |
| 79F | 145-125 | 10-15 | 9½ | do | do | Do. |
| 80F | 125-130 | 10-15 | 2½ | do | do | Do. |
| 81F | 125-130 | 10-15 | 2¾ | do | do | Soluble. |
| 82F | 125-130 | 10-15 | 3 | do | do | Do. |
| 83F | 125-130 | 10-15 | 5¾ | do | do | Do. |
| 84F | 125-130 | 10-15 | 6 | do | do | Insoluble. |
| 85F | 145-125 | 10-15 | 14 | do | do | Do. |
| 86F | 125-130 | 10-15 | 2 | do | do | Do. |
| 87F | 125-130 | 10-15 | 2½ | do | do | Soluble. |
| 88F | 125-130 | 10-15 | 4 | do | do | Do. |
| 89F | 125-130 | 10-15 | 4½ | do | do | Do. |
| 90F | 125-130 | 10-15 | 5¼ | do | do | Do. |

TABLE XIV

| Ex. No. | Max. temp., °C. | Max. pres., p.s.i. | Time, hrs. | Solubility Water | Solubility Xylene | Solubility Kerosene |
|---|---|---|---|---|---|---|
| 1G | 145-125 | 10-15 | 27 | Insoluble | Soluble | Soluble. |
| 2G | 125-130 | 10-15 | 1 | ----do---- | ----do---- | Do. |
| 3G | 125-130 | 10-15 | 1 | ----do---- | ----do---- | Insoluble. |
| 4G | 125-130 | 10-15 | 1½ | ----do---- | ----do---- | Do. |
| 5G | 125-130 | 10-15 | 2 | ----do---- | ----do---- | Do. |
| 6G | 125-130 | 10-15 | 2 | Emulsifiable | ----do---- | Do. |
| 7G | 145-125 | 10-15 | 24 | Insoluble | ----do---- | Soluble. |
| 8G | 125-130 | 10-15 | 1 | ----do---- | ----do---- | Do. |
| 9G | 125-130 | 10-15 | 1¼ | ----do---- | ----do---- | Insoluble. |
| 10G | 125-130 | 10-15 | 1¼ | ----do---- | ----do---- | Do. |
| 11G | 125-130 | 10-15 | 2 | Emulsifiable | ----do---- | Do. |
| 12G | 125-130 | 10-15 | 4½ | ----do---- | ----do---- | Do. |
| 13G | 145-125 | 10-15 | 19.0 | Insoluble | ----do---- | Do. |
| 14G | 125-130 | 10-15 | 1 | ----do---- | ----do---- | Do. |
| 15G | 125-130 | 10-15 | ¾ | Emulsifiable | ----do---- | Do. |
| 16G | 125-130 | 10-15 | ¾ | ----do---- | ----do---- | Do. |
| 17G | 125-130 | 10-15 | 1 | ----do---- | ----do---- | Do. |
| 18G | 125-130 | 10-15 | 1½ | ----do---- | ----do---- | Do. |
| 19G | 145-125 | 10-15 | 18½ | Insoluble | ----do---- | Do. |
| 20G | 125-130 | 10-15 | 2½ | ----do---- | ----do---- | Do. |
| 21G | 125-130 | 10-15 | 2 | ----do---- | ----do---- | Do. |
| 22G | 125-130 | 10-15 | 3 | ----do---- | ----do---- | Do. |
| 23G | 125-130 | 10-15 | 3 | ----do---- | ----do---- | Soluble. |
| 24G | 125-130 | 10-15 | 5¼ | ----do---- | ----do---- | Do. |
| 25G | 145-125 | 10-15 | 19 | Emulsifiable | ----do---- | Insoluble. |
| 26G | 125-130 | 10-15 | 3 | ----do---- | ----do---- | Do. |
| 27G | 125-130 | 10-15 | 3 | Insoluble | ----do---- | Do. |
| 28G | 125-130 | 10-15 | 3½ | ----do---- | ----do---- | Do. |
| 29G | 125-130 | 10-15 | 3¾ | ----do---- | ----do---- | Do. |
| 30G | 125-130 | 10-15 | 5¾ | ----do---- | ----do---- | Soluble. |
| 31G | 145-125 | 10-15 | 23 | Emulsifiable | ----do---- | Insoluble. |
| 32G | 125-130 | 10-15 | 1 | ----do---- | ----do---- | Do. |
| 33G | 125-130 | 10-15 | 1½ | ----do---- | ----do---- | Do. |
| 34G | 125-130 | 10-15 | 2¾ | ----do---- | ----do---- | Do. |
| 35G | 125-130 | 10-15 | 3 | ----do---- | ----do---- | Do. |
| 36G | 125-130 | 10-15 | 6½ | Insoluble | ----do---- | Do. |

PART 9

As to the use of conventional demulsifying agents reference is made to U.S. Patents No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example 6G, herein described.

PART 10

The products, compounds, or the like, herein described can be employed for various purposes and particularly for the resolution of petroleum emulsions of the water-in-oil type as described in detail in Part 9, preceding.

Such products can be reacted with alkylene imines, such as ethylene imine or propylene imine, to produce cation-active materials. Instead of an imine one may employ what is a somewhat equivalent material, to wit, a dialkylaminoepoxypropane of the structure

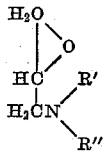

wherein R' and R" are alkyl groups.

It is not necessary to point out that, after reaction with a reactant of the kind described which introduces a basic nitrogen atom, the resultant product can be employed for the resolution of emulsions of the water-in-oil type as described in Part 9, preceding, and also for other purposes described hereinafter.

Referring now to the use of the products obtained by reaction with a polyepoxide and certain specified oxyalkylated products obtained in the manner described in Part 8, preceding, it is to be noted that in addition to their use in the resolution of petroleum emulsions that may be used as emulsifying agents for oils, fats, and waxes, as ingredients in insecticide compositions, or as detergents and wetting agents in the laundering, scouring, drying, tanning and mordanting industries. They may also be used for preparing boring or metal-cutting oils and cattle dips, as metal pickling inhibitors, and for pharmaceutical purposes.

Not only do these oxyalkylated derivatives have utility as such but they can serve as initial materials for more complicated reactions of the kind ordinarily requiring a hydroxyl radical. This includes esterification, etherization, etc.

The oxyalkylated derivatives may be used as valuable additives to lubricating oils, both those derived from petroleum and synthetic lubricating oils. Also, they can be used as additives to hydraulic brake fluids of the aqueous and non-aqueous types. They may be used in connection with other processes where they are injected into an oil or gas well for purpose of removing a mud sheath, increasing the ultimate flow of fluid from the surrounding strata, and particularly in secondary recovery operations using aqueous flood waters. These derivatives also are suitable for use in dry cleaners' soaps.

More specifically, such products, depending on the nature of the initial resin, the particular monoepoxide selected and the ratio of monoepoxide to resin, together with the particular polyepoxide employed, result in a variety of materials which are useful as wetting agents or surface tension reducing agents; as detergents, emulsifiers or dispersing agents; as additives for lubricants, both of the natural petroleum type and the synthetic type, as additives in the flotation of ores, and at times as aids in chemical reactions insofar that demulsification is produced between the insoluble reactants. Furthermore, such products can be used for a variety of other purposes, including use as corrosion inhibitors, defoamers, asphalt additives, and at times even in the resolution of oil-in-water emulsions. They serve at times as mutual solvents promoting a homogeneous system from two otherwise insoluble phases.

The products herein described can be reacted with polycarboxy acids such as phthalic acid, or anhydride, maleic acid or anhydride, diglycolic acid, and various tricarboxy and tetracarboxy acids so as to yield acylated derivatives particularly if one employs one mole of the polycarboxy acid for each reactive hydroxyl radical present in the final polyepoxide treated product. Thus, one obtains a comparatively large molecule in which there is a plurality of carboxyl radicals. Such acidic fractional esters are suitable for the resolution of petroleum emulsions of the water-in-oil type as herein described.

Having thus described our invention, what we claim as new and desire to secure by Letters Patent is:

1. A 3-step manufacturing method involving (1) condensation; (2) oxyalkylation with a polyepoxide containing at least two 1,2-epoxy rings; and (3) oxyalkylation with an alpha-beta monoepoxide; said first manufacturing process being a step of (A) condensing (a) a fusible, non-oxygenated organic solvent-soluble, water-insoluble, phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

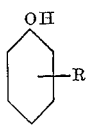

in which R is a saturated aliphatic hydrocarbon radical having at least 4 and not more than 24 carbon atoms and substituted in the 2,4,6 position; (b) a basic hydroxylated polyamine having at least one secondary amino group and having up to 32 carbon atoms in any radical attached to any amino nitrogen atom, and with the further proviso that the polyamine be free from any primary amino radical, any substituted imidazoline radical and any substituted tetrahydropyrimidine radical; and (c) formaldehyde; said condensation reaction being conducted at a temperature sufficiently high to eliminate water and below the pyrolytic point of the reactants and resultants of reaction; and with the proviso that the resinous condensation product resulting from the process be heat stable; followed as a second step by (B) reacting said resin condensate with a phenolic polyepoxide free from reactive functional groups other than 1,2-epoxy and hydroxyl groups and cogenerically associated compounds formed in the preparation of said polyepoxides; said epoxides being monomers and low molal polymers not exceeding the tetramers; said polyepoxides being selected from the class consisting of (aa) compounds where the phenolic nuclei are directly joined without an intervening bridge radical, and (bb) compounds containing a radical in which 2 phenolic nuclei are joined by a divalent radical selected from the class consisting of ketone residues formed by the elimination of the ketonic oxygen atom and aldehyde residues obtained by the elimination of the aldehyde oxygen atom, the divalent radical $$\begin{array}{c} H\ H \\ -C-C- \\ H\ H \end{array}$$

the divalent

radical, the divalent sulfone radical, and divalent monosulfide radical —S—, the divalent radical —CH$_2$SCH$_2$—, and the divalent disulfide radical —S—S—; said phenolic portion of the polyepoxide being obtained from a phenol of the structure

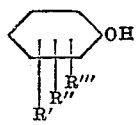

in which R', R", and R''' represent a member of the class consisting of hydrogen and saturated hydrocarbon sub-stituents of the aromatic nucleus, said substituent member having not over 18 carbon atoms; with the further proviso that said reactive amine-modified resin condensates (AA) and aryl polyepoxides (BB) be members of the class consisting of non-thermosetting organic solvent-soluble liquids and solids melting below the point of pyrolysis; with the added proviso that the reaction product be a member of the class of solvent-soluble liquids and solids melting below the point of pyrolysis; said reaction between (AA) and (BB) be conducted below the pyrolytic point of the reactants and the resultants of reaction; and with the final proviso that the ratio of reactants be 2 moles of the oxyalkylated resin condensate to 1 mole of the phenolic polyepoxide, and then completing the reaction by a third step of (C) reacting said polyepoxide-derived product with a monoepoxide; said monoepoxide being an alpha-beta alkylene oxide having not more than 4 carbon atoms and selected from the class consisting of ethylene oxide, propylene oxide, butylene oxide, glycide and methylglycide.

2. A 3-step manufacturing method involving (1) condensation; (2) oxyalkylation with a diepoxide; and (3) oxyalkylation with an alpha-beta monoepoxide; said first manufacturing process being a step of (A) condensing (a) a fusible, non-oxygenated organic solvent-soluble, water-insoluble, phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

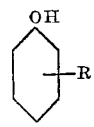

in which R is a saturated aliphatic hydrocarbon radical having at least 4 and not more than 24 carbon atoms and substituted in the 2,4,6 position; (b) a basic hydroxylated polyamine having at least one secondary amino group and having up to 32 carbon atoms in any radical attached to any amino nitrogen atom, and with the further proviso that the polyamine be free from any primary amino radical, any substituted imidazoline radical and any substituted tetrahydropyrimidine radical; and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable; followed as a second step by (B) reacting said resin condensate with a compound consisting essentially of the following formula

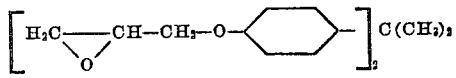

with the further proviso that said reactive amine-modified resin condensates (AA) and aryl diepoxides (BB) be members of the class consisting of non-thermosetting organic solvent-soluble liquids and solids melting below the point of pyrolysis; with the added proviso that the reaction product be a member of the class of solvent-soluble liquids and solids melting below the point of pyrolysis; said reaction between (AA) and (BB) be conducted below the pyrolytic point of the reactants and the resultants of reaction; and with the final proviso that the ratio of reactants be 2 moles of the oxyalkylated resin condensate to 1 mole of the phenolic diepoxide, and then completing the reaction by a third step of (C) reacting said diepoxide-derived product with a monoepoxide; said monoepoxide being an alpha-beta alkylene oxide having not more than 4 carbon atoms and selected from the class consisting of ethylene oxide, propylene oxide, butylene oxide, glycide and methyl-glycide.

3. The method of claim 1 wherein the precursory phenol employed in preparing the phenol-aldehyde resin reactant (A) contains at least 4 and not over 14 carbon atoms in the substituent radical and the precursory aldehyde employed in preparing the phenol-aldehyde resin reactant (A) is formaldehyde.

4. The product obtained by the method described in claim 1.

References Cited in the file of this patent
UNITED STATES PATENTS

| | | |
|---|---|---|
| 2,499,365 | De Groote et al. | Mar. 7, 1950 |
| 2,521,911 | Greenlee | Sept. 12, 1950 |
| 2,743,254 | De Groote | Apr. 24, 1956 |